(12) United States Patent
Johnson, Jr. et al.

(10) Patent No.: US 8,077,844 B2
(45) Date of Patent: *Dec. 13, 2011

(54) DIAL UP TELEPHONE CONFERENCING SYSTEM CONTROLLED BY AN ONLINE COMPUTER NETWORK

(75) Inventors: Clark E. Johnson, Jr., Waunakee, WI (US); Richard J. Solomon, Monson, MA (US); Tice F. DeYoung, Fairfax, VA (US); David J. Farber, Pittsburgh, PA (US)

(73) Assignee: Xugave Holding DE LLC, Dover, DE (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/410,269

(22) Filed: Mar. 24, 2009

(65) Prior Publication Data

US 2009/0252310 A1 Oct. 8, 2009

Related U.S. Application Data

(63) Continuation of application No. 10/705,571, filed on Nov. 10, 2003, now Pat. No. 7,522,542, which is a continuation of application No. 10/087,671, filed on Mar. 1, 2002, now Pat. No. 6,661,779, which is a continuation of application No. 09/819,079, filed on Apr. 30, 2001, now Pat. No. 6,480,474, which is a continuation of application No. 09/587,080, filed on Jun. 3, 2000, now Pat. No. 6,266,328, which is a continuation-in-part of application No. 09/212,786, filed on Dec. 16, 1998, now Pat. No. 6,072,780, which is a continuation-in-part of application No. 08/918,564, filed on Aug. 22, 1997, now abandoned.

(60) Provisional application No. 60/024,592, filed on Aug. 26, 1996.

(51) Int. Cl.
*H04M 11/00* (2006.01)

(52) U.S. Cl. .................. 379/93.21; 379/90.01; 370/352
(58) Field of Classification Search .............. 379/93.21, 379/90.01; 370/260, 352
See application file for complete search history.

(56) References Cited

U.S. PATENT DOCUMENTS 4,475,189 A 10/1984 Herr et al.
(Continued)

FOREIGN PATENT DOCUMENTS

CA 2216035 3/1997
(Continued)

OTHER PUBLICATIONS

"Integrated SS7", http://web.archive.org/web/19970618052054/www.summa4.com/prodss7.htm, 3 pages, Sep. 1995.

(Continued)

*Primary Examiner* — Stella Woo
(74) *Attorney, Agent, or Firm* — Christensen O'Connor Johnson Kindness PLLC

(57) ABSTRACT

In a telephone conferencing system, a digital communication network such as the Internet is used to establish and control the telephone connections between multiple conferees with the telephone network being the means of exchanging verbal information. Each conferee may have a computer connected to the digital network, and each has an independent telephone instrument connected to the public switched telephone network. An in-charge conferee utilizes his computer containing appropriate software to initiate the conference and to control the participation of the conferees. The in-charge conferee sends digital control signals to a switch interface controlling a telephone switch as a gateway to the telephone network using SS7 control signals. These SS7 control signals include the commands by which the conferee telephones are rung up, brought on line, or dropped from the conference. The switch provides telephone status information back over the digital network, and the in-charge conferee, as well as other conferees provided with appropriate software, display this status information on their PC monitors.

23 Claims, 4 Drawing Sheets

U.S. PATENT DOCUMENTS

| | | |
|---|---|---|
| 4,788,718 A | 11/1988 | McNabb et al. |
| 4,796,293 A | 1/1989 | Blinken et al. ............... 379/202 |
| 4,866,758 A | 9/1989 | Heinzelmann ................. 379/94 |
| 4,872,160 A | 10/1989 | Hemmady et al. ............. 370/60 |
| 4,872,197 A | 10/1989 | Pemmaraju .................... 379/93 |
| 4,945,219 A | 7/1990 | Tanaka ......................... 235/488 |
| 4,958,341 A | 9/1990 | Hemmady et al. ........... 370/60.1 |
| 4,965,788 A | 10/1990 | Newman ........................ 370/60 |
| 5,222,085 A | 6/1993 | Newman ........................ 370/60 |
| 5,245,603 A | 9/1993 | Newman ........................ 370/54 |
| 5,247,571 A | 9/1993 | Kay et al. ...................... 379/207 |
| 5,341,374 A | 8/1994 | Lewen et al. ................. 370/85.4 |
| 5,367,518 A | 11/1994 | Newman ........................ 370/54 |
| 5,375,068 A | 12/1994 | Palmer et al. ................. 364/514 |
| 5,396,491 A | 3/1995 | Newman ........................ 370/60 |
| 5,410,754 A | 4/1995 | Klotzbach et al. ......... 370/85.13 |
| 5,425,084 A | 6/1995 | Brinskele ....................... 379/112 |
| 5,434,913 A | 7/1995 | Tung et al. ..................... 379/202 |
| 5,438,568 A | 8/1995 | Weisser, Jr. .................... 370/389 |
| 5,471,318 A | 11/1995 | Ahuja et al. |
| 5,475,732 A | 12/1995 | Pester, III ....................... 379/34 |
| 5,483,588 A | 1/1996 | Eaton et al. .................... 379/202 |
| 5,490,247 A | 2/1996 | Tung et al. ..................... 395/162 |
| 5,493,568 A | 2/1996 | Sampat et al. .................. 370/60 |
| 5,506,832 A | 4/1996 | Arshi et al. ..................... 370/13 |
| 5,515,296 A | 5/1996 | Agarwal ......................... 364/514 |
| 5,526,353 A | 6/1996 | Henley et al. .................. 370/60 |
| 5,533,110 A | 7/1996 | Pinard et al. ................... 379/201 |
| 5,546,452 A | 8/1996 | Andrews et al. ............... 379/219 |
| 5,559,875 A | 9/1996 | Bieselin et al. ................ 379/202 |
| 5,586,177 A | 12/1996 | Farris et al. .................... 379/230 |
| 5,608,786 A | 3/1997 | Gordon .......................... 379/100 |
| 5,619,555 A | 4/1997 | Fenton et al. .................. 379/67 |
| 5,629,978 A | 5/1997 | Blumhardt et al. ........... 379/201 |
| 5,631,948 A | 5/1997 | Bartholomew et al. ........ 379/67 |
| 5,659,542 A | 8/1997 | Bell et al. |
| 5,661,782 A | 8/1997 | Bartholomew et al. ........ 379/67 |
| 5,661,790 A | 8/1997 | Hsu ................................ 379/209 |
| 5,664,010 A | 9/1997 | Walker et al. ................. 379/207 |
| 5,664,102 A | 9/1997 | Faynberg ................. 395/200.76 |
| 5,668,863 A | 9/1997 | Bieselin et al. ................ 379/202 |
| 5,680,442 A | 10/1997 | Bartholomew et al. ........ 379/67 |
| 5,689,553 A | 11/1997 | Ahuja et al. |
| 5,694,463 A | 12/1997 | Christie et al. ................ 379/230 |
| 5,706,286 A | 1/1998 | Reiman et al. ................. 370/401 |
| 5,712,907 A | 1/1998 | Wegner et al. ................ 379/112 |
| 5,724,355 A | 3/1998 | Bruno et al. ................... 370/401 |
| 5,726,984 A | 3/1998 | Kubler et al. .................. 370/349 |
| 5,737,404 A | 4/1998 | Segal .............................. 379/230 |
| 5,751,706 A | 5/1998 | Land et al. ..................... 370/352 |
| 5,765,108 A | 6/1998 | Martin et al. .................. 455/422 |
| 5,774,695 A | 6/1998 | Autrey et al. .................. 395/500 |
| 5,790,548 A | 8/1998 | Sistanizadeh et al. ......... 370/401 |
| 5,793,771 A | 8/1998 | Darland et al. ................ 370/467 |
| 5,793,839 A | 8/1998 | Farris et al. .................... 379/34 |
| 5,812,639 A | 9/1998 | Bartholomew et al. ......... 379/89 |
| 5,812,652 A | 9/1998 | Jodoin |
| 5,818,836 A | 10/1998 | DuVal ............................ 370/389 |
| 5,852,656 A | 12/1998 | Sato et al. ...................... 379/93.21 |
| 5,862,208 A | 1/1999 | MeLampy et al. ......... 379/212.01 |
| 5,870,565 A | 2/1999 | Glitho ...................... 395/200.79 |
| 5,878,130 A | 3/1999 | Andrews et al. ............... 379/265 |
| 5,883,891 A | 3/1999 | Williams et al. ............... 370/356 |
| 5,883,964 A | 3/1999 | Alleman ......................... 379/205 |
| 5,884,032 A | 3/1999 | Bateman et al. ............... 395/200 |
| 5,896,500 A | 4/1999 | Ludwig et al. ............. 395/200.34 |
| 5,898,839 A | 4/1999 | Berteau .................... 395/200.57 |
| 5,912,887 A | 6/1999 | Sehgal ............................ 370/354 |
| 5,916,302 A | 6/1999 | Dunn et al. .................... 709/204 |
| 5,917,817 A | 6/1999 | Dunn et al. .................... 370/352 |
| 5,923,659 A | 7/1999 | Curry et al. .................... 370/401 |
| 5,926,535 A | 7/1999 | Reynolds .................. 379/221.06 |
| 5,933,490 A | 8/1999 | White et al. ................... 379/221 |
| 5,940,479 A | 8/1999 | Guy et al. ..................... 379/93.01 |
| 5,943,414 A | 8/1999 | McIntee et al. |
| 5,949,762 A | 9/1999 | Green et al. ................... 370/259 |
| 5,953,405 A | 9/1999 | Miloslavsky |
| 5,963,632 A | 10/1999 | Miloslavsky |
| 5,987,102 A | 11/1999 | Elliott et al. ................. 379/93.17 |
| 5,987,103 A | 11/1999 | Martino ...................... 379/93.17 |
| 5,995,605 A | 11/1999 | Madoch et al. ................ 379/201 |
| 5,995,608 A | 11/1999 | Detampel et al. .............. 379/205 |
| 5,995,614 A | 11/1999 | Miloslavsky |
| 6,009,469 A | 12/1999 | Mattaway et al. ............. 709/227 |
| 6,026,087 A | 2/2000 | Mirashrafi et al. ............ 370/389 |
| 6,031,836 A | 2/2000 | Haserodt ........................ 370/389 |
| 6,035,214 A | 3/2000 | Henderson ..................... 455/556 |
| 6,069,890 A | 5/2000 | White et al. ................... 370/352 |
| 6,072,780 A * | 6/2000 | Johnson et al. ................ 370/260 |
| 6,075,783 A | 6/2000 | Voit ................................ 370/352 |
| 6,075,796 A | 6/2000 | Katseff et al. .................. 370/466 |
| 6,078,579 A | 6/2000 | Weingarten ..................... 370/352 |
| 6,081,591 A | 6/2000 | Skoog ............................ 379/230 |
| 6,084,956 A | 7/2000 | Turner et al. ................... 379/230 |
| 6,091,808 A | 7/2000 | Wood et al. .................... 379/201 |
| 6,097,804 A | 8/2000 | Gilbert et al. .................. 379/230 |
| 6,101,182 A | 8/2000 | Sistanizadeh et al. ......... 370/352 |
| 6,101,246 A | 8/2000 | Heinmiller et al. ............ 379/142 |
| 6,122,255 A | 9/2000 | Bartholomew et al. ........ 370/237 |
| 6,125,113 A | 9/2000 | Farris et al. .................... 370/389 |
| 6,128,285 A | 10/2000 | Buhler et al. .................. 379/242 |
| 6,130,933 A | 10/2000 | Miloslavsky ................. 379/90.01 |
| 6,134,235 A | 10/2000 | Goldman et al. .............. 370/352 |
| 6,137,792 A | 10/2000 | Jonas et al. .................... 370/354 |
| 6,144,670 A | 11/2000 | Sponaugle et al. ............ 370/401 |
| 6,147,988 A | 11/2000 | Bartholomew et al. ........ 370/352 |
| 6,148,068 A | 11/2000 | Lowery et al. |
| 6,154,445 A | 11/2000 | Farris et al. .................... 370/237 |
| 6,167,432 A | 12/2000 | Jiang .............................. 709/204 |
| 6,172,675 B1 | 1/2001 | Ahmad et al. ................. 345/328 |
| 6,178,181 B1 | 1/2001 | Glitho ............................ 370/467 |
| 6,181,786 B1 | 1/2001 | Detampel, Jr. et al. ........ 379/205 |
| 6,181,788 B1 | 1/2001 | Miloslavsky |
| 6,185,204 B1 | 2/2001 | Voit ................................ 370/352 |
| 6,198,738 B1 | 3/2001 | Chang et al. ................... 370/352 |
| 6,201,804 B1 | 3/2001 | Kikinis |
| 6,201,863 B1 | 3/2001 | Miloslavsky |
| 6,215,858 B1 | 4/2001 | Bartholomew et al. ..... 379/88.17 |
| 6,222,826 B1 | 4/2001 | Faynberg et al. .............. 370/252 |
| 6,226,286 B1 | 5/2001 | Danne et al. ................... 370/352 |
| 6,243,373 B1 | 6/2001 | Turock .......................... 370/352 |
| 6,266,328 B1 * | 7/2001 | Johnson et al. ................ 370/260 |
| 6,278,707 B1 | 8/2001 | MacMilla et al. ............. 370/352 |
| 6,282,193 B1 | 8/2001 | Hluchyj et al. ................ 370/356 |
| 6,285,745 B1 | 9/2001 | Bartholomew et al. ..... 379/88.17 |
| 6,324,183 B1 | 11/2001 | Miller et al. ................... 370/467 |
| 6,324,264 B1 | 11/2001 | Wiener et al. .............. 379/88.22 |
| 6,330,321 B2 | 12/2001 | Detampel, Jr. et al. ..... 379/205.1 |
| 6,333,931 B1 * | 12/2001 | LaPier et al. .................. 370/352 |
| 6,337,858 B1 | 1/2002 | Petty et al. ..................... 370/356 |
| 6,339,593 B1 | 1/2002 | Kikinis |
| 6,377,576 B1 | 4/2002 | Zwick et al. ................... 379/389 |
| 6,381,238 B1 | 4/2002 | Hluchyj ......................... 379/352 |
| 6,392,760 B1 | 5/2002 | Ahuja et al. |
| 6,418,214 B1 | 7/2002 | Smythe et al. ............ 379/202.01 |
| 6,430,282 B1 | 8/2002 | Bannister et al. .......... 379/211.02 |
| 6,438,218 B1 | 8/2002 | Farris et al. ................. 379/88.17 |
| 6,442,169 B1 | 8/2002 | Lewis ............................ 370/401 |
| 6,445,694 B1 | 9/2002 | Swartz ........................... 370/352 |
| 6,449,344 B1 | 9/2002 | Goldfinger et al. ......... 379/88.17 |
| 6,452,925 B1 | 9/2002 | Sistanizadeh et al. ......... 370/352 |
| 6,453,034 B1 | 9/2002 | Donovan et al. .......... 379/220.01 |
| 6,456,615 B1 | 9/2002 | Kikinis |
| 6,459,449 B1 | 10/2002 | Juen .............................. 348/223 |
| 6,480,474 B2 * | 11/2002 | Johnson et al. ................ 370/260 |
| 6,501,740 B1 | 12/2002 | Sun et al. ....................... 370/261 |
| 6,584,093 B1 | 6/2003 | Salama et al. |
| 6,628,767 B1 | 9/2003 | Wellner |
| 6,650,631 B1 | 11/2003 | Benash et al. ................. 370/352 |
| 6,661,779 B2 * | 12/2003 | Johnson et al. ................ 370/260 |
| 6,807,185 B1 | 10/2004 | Bell et al. |
| 6,816,469 B1 | 11/2004 | Kung |
| 6,853,636 B1 | 2/2005 | Merchant ...................... 370/352 |
| 6,870,827 B1 | 3/2005 | Voit et al. ...................... 370/352 |
| 6,904,060 B2 | 6/2005 | Nelson et al. .................. 370/526 |
| 7,266,186 B1 | 9/2007 | Henderson ................. 379/142.04 |
| 7,522,542 B2 * | 4/2009 | Johnson et al. ................ 370/260 |

| | | | |
|---|---|---|---|
| 2001/0016038 | A1 | 8/2001 | Sammon |
| 2001/0040885 | A1 | 11/2001 | Jonas et al. |
| 2002/0064149 | A1 | 5/2002 | Elliott et al. ............ 370/352 |
| 2003/0007622 | A1 | 1/2003 | Kalmanek, Jr. et al. ...... 379/219 |
| 2003/0193933 | A1 | 10/2003 | Jonas et al. ............ 370/352 |
| 2008/0013531 | A1 | 1/2008 | Elliott et al. ............ 370/356 |

FOREIGN PATENT DOCUMENTS

| | | |
|---|---|---|
| CA | 2 303 392 C | 4/2004 |
| CA | 2303392 | 4/2004 |
| EP | 07165333 | 10/1999 |
| EP | 0964567 | 12/1999 |
| EP | 0969687 | 1/2000 |
| EP | 0 847 178 B1 | 1/2004 |
| EP | 0847178 | 1/2004 |
| WO | WO 99/41890 | 8/1999 |
| WO | 01/72022 A1 | 9/2001 |

OTHER PUBLICATIONS

"Summa Four: Building Intelligent Wireless Networks", http://web.archive.org/web/19970618052906/www.summa4.com/prodw-wpaper.htm, 4 pages, Mar. 1996.

"Summa Four Demonstrates Next Major Telecommunications Trend: Open, Programmable Switching for Intelligent Services and Transport", http://web.archive.org/web/19970618052019/www.summa4.com/jan2495.htm, 2 pages, Jan. 24, 1995.

"SDS Distributed Switch: The Workstation for Intelligent Network Services", http://web.archive.org/web/19970618051855/www.summa4.com/april95.htm, 4 pages, Apr. 1995.

"Summa Four Integrates SS7 into its VCO Open Programmable Switches", http://web.archive.org/web/19970618051726/www.summa4.com/oct395c.htm, 2 pages, Oct. 3, 1995.

Faynberg et al., "A Proposal for Internet and Public Switched Telephone Networks (PSTN) Internetworking", Network Working Group, pp. 1-10, Mar. 1997.

Krishnaswamy et al., "Information Exchange to be Supported by the Service Support Transfer Protocol (SSTP)" Jul. 1997.

Conroy et al, "Analysis of Services and Interfaces Used When Interworking Between the Internet and the Intelligent network (I.N.)" pp. 1-19, Jul. 7, 1997.

Sinnreich et al., "Standards Framework for Internet Telephony", Aug. 12, 1997.

Krishnaswamy et al., "PSTN-Internet Internetworking—An Architecture Overview", pp. 1-15, Nov. 1997.

Burg et al., "An Architecture and Protocols for Initiation and Control of Telephone Calls From Terminals Connected to a Call Broker Over a TCP/IP Connection", Internet Engineering Task Force, pp. 1-13, Dec. 1997.

Dalias et al., "Bay Networks SS7-Internet Gateway Architecture", Transport Working Group, pp. 1-11, May 1998.

"Cisco Delivers SS7 Solution for Advanced IP Network Access", Cisco Systems, Inc., Jun. 8, 1998.

Cuervo et al., "SS7-Internet Internetworking Architectural Framework", Jul. 1998.

Arango et al., Simple Gateway Control Protocol (SGCP), Internet Engineering Task Force, pp. 1-79, Jul. 30, 1998.

Ma, "H.323 Signaling and SS7 ISUP Gateway: Procedure Interworking", Telecom Technologies, Inc., Oct. 1998.

Forbes, "Requirements for Functional Architecture for IN Support of IP-Networks", ITU Telecommunications, Mar. 1, 1999.

"Lucent Technologies Announces Click-to-Dial Web Services and Intelligent Network Capabilities for Voice Over Data Networks", Lucent Technologies, May 12, 1999.

Vaha-Sipila, "URLs for Telephone Calls", pp. 1-18, Aug. 19, 1999.

Höneisen, "Convergence of Internet and Intelligent Networks: Interactions of Services Using PINT", Nokia Research Center, pp. 1-106, Sep. 10, 1999.

Petrack et al., "The PINT Service Protocol: Extensions to SIP and SDP for IP Access to Telephone Call Services", Internet Engineering Task Force, pp. 1-60, Oct. 6, 1999.

Faynberg et al., "Converged Networks and Services: Internetworking IP and the PSTN", Wiley Computer Publishing, pp. 1-347, Jan. 2000.

"Nortel Networks Universal Signaling Point for Seamless Interworking", Nortel Networks, Jan. 2000.

"SS7 Tutorial", Performance Technologies, Inc., Jan. 2000.

Greene et al., "Media Gateway Control Protocol Architecture and Requirements", Network Working Group, Apr. 2000.

Rosen et al., "BGP / MPLS VPNs", Network Working Group May 2000.

Petrack et al., "The PINT Service Protocol: Extensions to SIP and SDP for IP Access to Telephone Call Services", Jun. 2000.

Schulzrinne, "Signaling for Internet Telephony Services", OPENSIG Fall '96 Workshop, Columbia University, pp. 1-13, Oct. 1996.

Newton, "Computer Telephony Goes Interoperable", Computer Telephony, pp. 14-20, Mar. 1995.

Grigonis, "The Origin of Lan Call-Control Apis", Computer Telephony, pp. 102-103, Apr. 1995.

"Telephony Services 2.1", Computer Telephony, pp. 34, 39-41, Aug. 1995.

Simeonov et al., "@INGate: A Distributed Intelligent Network Approach to Bridge Switching and Packet Networks", Proceedings of the International Conference on Computer Communications and Networks, pp. 358-363, Sep. 1997.

Cronin, "An Introduction to TSAPI and Network Telephony", IEEE Communications Magazine, pp. 48-54, Apr. 1996.

Defendant Comcast Corporation's Preliminary Invalidity Contentions in Caritas Technologies, Inc. v. Comcast Corporation, Jan. 12, 2006, U.S. District Court for the Eastern District of Texas Marshall Division, 2-05CV-339DF.

"Sun XTL 1.1 Administrator's Guide", Sun Microsystems XTL Computer-Telephony System, Dec. 1995.

"Sun XTL 1.1 Application Programmer's Guide", Sun Microsystems XTL Computer-Telephony System, Dec. 1995.

"Sun XTL 1.1 Architecture Guide", Sun Microsystems XTL Computer-Telephony System, Dec. 1995.

"Sun XTL 1.1 Provider Programmer's Guide", Sun Microsystems XTL Computer-Telephony System, Dec. 1995.

"Sun XTL 1.1 Remote Client Manager Guide", Sun Microsystems XTL Computer-Telephony System, Dec. 1995.

Nixon, "Windows Telephony (TAPI) Support in NT 4.0", Windows Telephony, Microsoft Corporation, pp. 1-6, Jun. 1996.

"TAPI Remote Service Provider" Version 2.1 of the Microsoft TAPI Software Development Kit, Jun. 1997.

DEC CIT Applications Interface for VMS Programming Reference, Version 3.0 Manual Set, Oct. 1991.

DEC CIT Applications Interface for VMS Programming, Version 3.0 Manual Set, Oct. 1991.

Strathmeyer, "An Introduction to Computer Telephony", IEEE Communications Magazine, pp. 101-111, May 1996.

"Request for Proposals for a Telecommunications Delivery System over a Hybrid Fiber/Coax (1-IFC) Architecture", PacketCable, Jul. 1994.

"PacketCable Gatekeeper Technology Request for Information", Dec. 30, 1997.

Greene, "Will voice over IP turn the telephony mart on its ear?" Network World, Inc., Aug. 19, 1996.

"IDT Announces Plans to Release Phone-to-Phone Technology Via the Internet", net2phone Oct. 1, 1996 Press Release.

"IDT Unveils Revolutionary Telecommunications Technology", net2phone Jul. 16, 1996 Press Release.

"DEFINITY® Enterprise Communications Server Release 5 CallVisor PC ASAI Installation and Reference", Lucent Technologies, Bell Labs Innovations, Oct. 1996.

"DEFINITY Communications System Generic 3v4 Call Visor ASAI Technical Reference", AT&T, Sep. 1995.

"DEFINITY Communications System Generic 3 Installation, Administration, and Maintenance of CallVisor ASAI over the DEFINITY LAN Gateway", AT&T, Jan. 1996.

"PacketCable™ 1.0 Architecture Framework Technical Report", PKT-TR-ARCH-V01-991201, Dec. 1999.

"PacketCable™ PSTN Gateway Call Signaling Protocol Specification", PKT-SP-TGCP-101-991201, Dec. 1999.

"PacketCable™ Internet Signaling Transport Protocol (ISTP) Specification", PKT-SP-ISTP-101-991201, Dec. 1999.

"PacketCable™ Network-Based Call Signaling Protocol Specification", PKT-SP-EC-MGCP-102-991201, Dec. 1999.
Software Product Description, DEC Computer Integrated Telephony for MS Windows, Version I.OA, DEC doc # SPD 43.54.01, Apr. 1993.
Software Product Description, DEC Computer Integrated Telephony Server 100/500, Version I.OA, DEC doc # SPD 36.33.02, Apr. 1993.
"Services for Computer Supported Telecommunications (CSTA) Phase I", Standard ECMA-179, Jun. 1992.
"Protocol for Computer Supported Telecommunications (CSTA) Phase I", Standard ECMA-180, Jun. 1992.
Schmandt et al., *An Audio and Telephone Server for. Multimedia Workstations*, IEEE Conference on Computer Workstations, pp. 150-160, 1988.
Wong, "*Personal Communications*", MIT Jun. 1991.
Redman, "*A User Programmable Telephone Switch*", Bell Communications Research, Sep. 12, 1988.
Margulies, "*Client Server Computer Telephony*", Flatiron Publishing, 1994.
Margulies, "*Client Server Computer Telephony (Second Edition)*", Flatiron Publishing, 1997.
Tak et al., "*Design and Implementation of Internetworking System between ATM and PSTN*", International Conference on Information, Communications and Signal Processing, pp. 776-780, 1997.
"*Generations™ System Operation Guide*", Voicetek Corporation, 1995.
"*VocalTec's Telephony Gateway—The Ultimate Internet Telephony Solution?*", Computer Telephony, pp. 30-35, Sep. 1996.
Bisdikian, et al., "*MultiMedia Digital Conferencing: A Web-enabled Multimedia Teleconferencing System*", IBM Journal of Research and Development, vol. 42. No. 2, pp. 281-298, Mar. 1988.
"*Visual Telephone Systems and Equipment for Local Area Networks which Provide a Non-guaranteed Quality of Service*", Draft ITU-T Recommendation H.323, May 28, 1996.
Arango et al., "*Simple Gateway Control Protocol (SGCP)*", The Simple Gateway Control Protocol, version 1.0, May 5, 1998.
Arango et al., "*The Media Gateway Control Protocol*", Version 1.0, Network Working Group, Oct. 1999.
Krapf, "*Cisco Adds Voice to Remote Access Routers*", Business Communications Review, p. 60, Dec. 1997.
Nortel, Marathon NetRunner: Installing the Power Supply Into an Integration Unit, Dec. 1995.
Nortel, Marathon 5KT Pro Owner's Manual Release 5.1 and Above, Nov. 1995.
Nortel, Micom Code Download User's Manual for Communications Control Module, Integration Router Module, T1 Access Module and Voice Software, Dec. 1995.
Nortel, Marathon NetRunner Release 5.0 Command Facility Reference Guide, Apr. 1996.
Nortel, E1 Access Module and Digital Voice Module User's Manual, Mar. 1996.
Nortel, Marathon STADIA Integration Hub Release 5.0: Integration Multiplexer User's Manual, Apr. 1996.
Nortel, NetRunner Release 5.0 WAN User's Manual, Apr. 1996.
Nortel, Marathon NetRunner Release 5.0 Network Management System Module User's Manual, Mar. 1996.
Nortel, Remote Terminal Server Release 3.1 User's Manual, Nov. 1995.
Nortel, T1 Access Module and Digital Voice Module User's Manual, Dec. 1995.
Nortel, Turbo Universal Voice/Fax Module and Telephone Interface Modules User's Manual, Mar. 1996.
Nortel, V/IP Selling Guide Release 1.1, Oct. 1997.
Nortel, Centrex IP: Extending a Tradition of Productivity Positioning Paper, 2000.
Nortel, CompuCALL/Meridian SCAI Introduction, Jul. 1993.
Nortel, V/IP Selling Guide, Nov. 1996.
Nortel, System Engineering Bulletin: UK CompuCALL, Mar. 31, 1995.
Nortel, V/IP Phone Fax IP Gateway Applications Guide: Complete Voice and Fax Integration Over IP Networks, Jun. 1997.
DEC, DEC CIT Server 100/500 Installation and Configuration (ULTRIX), Oct. 1991.
DEC, DEC CIT Server for VMS Installation and Configuration, Oct. 1991.
DEC, DEC CIT Applications Interface for ULTRIX Programming, Sep. 1991.
DEC, DEC CIT Applications Interface for ULTRIX Programming Reference (1-1 to 1-85), Oct. 1991.
Glitho, Isolating Faulty Routing Tables in SS7 Networks: Present and Future, May 1996.
DEC, Computer Integrated Telephony: Integrated Voice/Data Solutions-Merging Two Powerful Technologies in High-Payback Business Applications, 1992.
DEC, Press Release: Digital Announces Enterprise-Wide Integrated Voice/Data Capabilities Under Computer Integrated, Telephony Program, Mar. 14, 1989.
DEC, DEC CIT Applications Interface for ULTRIX Programming Reference (1-86 to 1-185), Oct. 1991.
DEC, DEC CIT Applications Interface for ULTRIX Programming Reference (1-186 to E-8), Oct. 1991.
Ensor et al., Communication Middleware for Multi-Party Multimedia Applications, 1997.
Lucent, MultiMedia Communications eXchange: Local and Wide Area Network Considerations—A Multimedia Communications Exchange White Paper, 1996.
Lucent, MultiMedia Communications eXchange: Multimedia Calling White Paper, 1996.
Lucent, MultiMedia Communications eXchange: Communications Middleware White Paper, 1996.
AT&T, AT&T Delivers First Product for New Multimedia Networks, Oct. 10, 1995.
Layland, Robin, AT&T Spins Off a Killer App for ATM, Nov. 1995.
AT&T, Vision 2000: The Multimedia Age-Business Communication in the 21st Century, Oct. 1995.
AT&T, The AT&T MultiMedia Communications eXchange: Dynamic Video, Voice, and Data from Workstation with the Ease-of-Use and Spontaneity of a Phone Call, 1996.
InSoft, InSoft Communique Key Component in AT&T GBCS New Multimedia Communications System, Oct. 30, 1995.
AT&T, AT&T Multimedia Communications eXchange Server Backgrounder, 1996.
AT&T, Multimedia Communications eXchage Customer & Partner Comments / Analyst References / AT&T GBCS Executive Biographies Profiles, 1996.
Lucent, MultiMedia Communication eXchange: Dynamic Voice, Video, and Data from Workstations with the Ease of Use and Spontaneity of a Phone Call, 1996.
Ullrich, MMCX Server Announced, Rewrites History, Nov. 1995.
AT&T, AT&T Goes Live with Multimedia Nets, Oct. 31, 1995.
Lucent, MultiMedia Communications eXchange: Local and Wide Area Network Considerations—A Multimedia Communications Exchange White Paper, 1996.
Lucent, MultiMedia Communicatoins eXchange: Integrating the Power of Video, Audio, and Data Collaboration, 1996.
AT&T, Multimedia Communications Network: Figure Drawings, Apr. 23, 1993.
AT&T, Example Application: Concept Trial Collaborative Meetings, Jun. 30, 1993.
AT&T, A User's Guide to the Rapport Desktop Conferencing System, Mar. 12, 1992.
Nortel, Marathon 20K Pro Owner's Manual-Release 5.1 and Above, Dec. 1996.
Nortel, Marathon Release 5.0 Startup Guide, Apr. 1996.
Nortel, Marathon 3K Voice/Fax Facility User's Manual, May 1996.
Nortel, Marathon NetRunner 5-Slot Chassis Installation and Cabling Manual, Jan. 1996.
Nortel, Six- and Twelve-Channel Expansion, Nov. 1995.
Nortel, Integration Router with EasyRouter Technology User's Manual, Jun. 1995.
Nortel, Marathon NetRunner Installing the Power Supply Into an Integration Unit, Feb. 1996.
Nortel, Marathon 5KT Pro Owner's Manual-Release 5.1 and Above, Nov. 1996.
Nortel, Centrex IP: Extending a Tradition of Productivity-Positioning Paper, 2000.

Nortel, V/IP Phone/Fax IP Gateway Applications Guide: Complete Voice and Fax Integration Over IP Networks, Jun. 1997.
Nortel, Marathon 20K Pro Owner's Manual Release 5.1 and Above, Dec. 1995.
Nortel, Marathon Release 5.0 Startup Guide for Marathon 2K, Marathon 2K Plus and Marathon 3K, Apr. 1996.
Nortel, Micom Communications V/IP Phone/Fax IP Gateway: Analog Voice Interface Card Models Release Version 1.0B, Dec. 15, 1996.
Nortel, Micom NetRunner 75E Integration Router, 1996.
Nortel, Micom Digital Direct Series T1: Marathon and NetRunner Integration Products, 1996.
Nortel, Integral 10Base-T Hub Module: Marathon and NetRunner Integration Products, 1997.
Nortel, Marathon Integration Products: Data, Voice, Fax, LAN, 1996.
Nortel, Micom Marathon 5KT Pro Integration Multiplexes, 1996.
Nortel, Micom ClearVoice: Toll Quality 8 KBPS Voice, 1996.
Cisco World, Voice Over IP Taps Intranet for Telephone Service, Nov. 1996.
Nortel, V/IP Phone/Fax IP Gateway Analog Voice Interface Cards for Netware and MS DOS User's Manual (Preliminary), Aug. 1996.
Nortel, Micom Technical Training: Remote Terminal Server (RTS)-Instructors Copy, Oct. 8, 1995.
Nortel, Micom Technical Training: Voice/Fax Support-Instructors Copy, Feb. 20, 1996.
Nortel, Micom Technical Training: Voice/Fax Support-Instructors Copy, May 23, 1997.
Nortel, V/IP Phone/Fax IP Gateway Applications Guide: Complete Voice and Fax Integration Over IP Networks, 1996.
Nortel, Micom Mod-Tap Cabling Solutions, Mar. 1995.
Nortel, Micom Mod-Tap Cabling Solutions-Overview, Mar. 1995.
Nortel, Micom Mod-Tap Cabling Solutions-Interface for EIA 568B, Mar. 1995.
Nortel, Micom Mod-Tap Cabling Solutions-Interface for EIA 568A, Mar. 1995.
Nortel, Micom Mod-Tap Cabling Solutions-Interface for USOC, Mar. 1995.
Nortel, Micom Mod-Tap Cabling Solutions-Test Equipment, Mar. 1995.
Nortel, Micom Mod-Tap Cabling Solutions-Ordering Information, Mar. 1995.
Nortel, Data, Voice, Fax, LAN, Jul. 1995.
Nortel, Technical Training Manual: Marathon Integration Multiplexer NetRunner Integration Router Network Configuration-Instructors Copy, Feb. 20, 1996.
ZDNet, Booting Up Windows 95, 1996.
Nortel, Micom Technical Training: V/IP Phone/Fax Gateway V/IP Analog T1/E1 DOS/NETWARE/WIN95, Aug. 25, 1997.
Nortel, V/IP Phone/Fax IP Gateway: Voice Interface Cards and PC Software, 1997.
Nortel, V/IP Phone/Fax IP Gateway: Applications Guide, 1997.
Various, Excerpts from Computer Telephony Magazine, 1996.
Novell, Novell Announces NetWare Telephony Services, Feb. 12, 1996.
Novell, Novell Announces Network Telephony Development Tools for Accessing Information by Telephone, Feb. 9, 1996.
Novell, Screen Shots: Novell News, Feb. 13, 1996.
Novell, Novell Product Announcement: NetWare Telephony Services 2.21, Feb. 8, 1996.
Novell, Novell Product Announcement: NetWare Telephony Services 2.1, Jul. 13, 1995.
InfoWorld, Industry Gets Serious About 'Net Phone Calls, Nov. 1996.
Various, Excerpts from Computer Telephony Magazine, Jan. 1997.
Novell, DeveloperNet: Telephony Services Partners Program-Guidelines, Mar. 1996.
Novell, Novell Telephony Services Information Directory, May 1996.
Cronin, An Introduction to TSAPI and Network Telephony, Apr. 1996.
Boyer et al., NetWare Connection: Talk is Cheap, Sep. 1995.
Novell, NetWare Telephony Services 2.21 / LAN Times: Starting Small, Thinking Big, 1996.
Dykeman, Terminal Togetherness, Sep. 1995.
Semilof, LAN Call Center to Aid Sales, Sep. 25, 1995.
Novell, Novell Education: Netware Telephony Services, 1994.
Novell, NetWare Telephony Services, 1994.
Business Issues in Technology Computer Letter, Busy Signals, Mar. 6, 1995.
Newton, Has Novell Abdicated Telephony Services, Nov. 1994.
Novell, TSCall Reference Card / Network Products Software License, 1990.
AT&T, PassageWay Telephony Services Solution:NetWare Telephony Services-DEFINITY System Network Manager's Guide Release 1.0, Mar. 1994.
Novell, NetWare Telephony Services TSCall User's Guide, Apr. 1994.
Novell, NetWare Telephony Services Network Manager's Guide, Apr. 1994.
Novell, NetWare 4.x Software License / Netware 4.1 Release Notes, 1993.
Novell, NetWare 4 Installation, Dec. 1994.
Novell, NetWare 4 Upgrade, Dec. 1994.
Novell, NetWare 4 Introduction to NetWare Directory Services, Dec. 1994.
Novell, NetWare 4 Installing and Using Novell Online Documentation, Dec. 1994.
Novell, Novell Limited Use Software License Agreement, Feb. 1993.
Novell / AT&T, PassageWay Telephony Services Solution:NetWare Telephony Services-DEFINITY System Simulator User's Guide Release 1.1, Mar. 1994.
Novell / AT&T, PassageWay Telephony Services Solution:NetWare Telephony Services-DEFINITY System Programmer's Guide Release 1.0, Mar. 1994.
Novell / AT&T, PassageWay Telephony Services Solution:NetWare Telephony Services-Definity System Network Manager's Guide Release 1.0, Mar. 1994.
Novell, NetWare Telephony Services TSCA11 User's Guidem Apr. 1994.
Novell / AT&T, NetWare: Telephony Server Application Programming Interface (TSAPI) Issue 1.9, 1994.
Novell, NetWare 4.x Software License, 1993.
Sun, SunXTL 1.1 Remote Client Manager Guide, Nov. 1995.
Sun, FAQs re: RMI and Object Serialization, 1996.
Sun, Mapping IDL to Java, Feb. 20, 1996.
Sun, SunXTL to be Supported by Linkon, Key PBX Makers, Mar. 6, 1995.
IRS, Instructions for Schedule D (Form 1120S), 1995.
Micom, V/IP Phone/Fax IP Gateway, 1998.
Arthur D. Little, Inc., Ltr to Cable Labs Re: Enterprise Management System Integration Cost and Benefit Analysis, Sep. 11, 1995.
MCNS Holdings, L.P., Data Over Cable Technical Reports Operations Support System Framework for Data Over Cable Services TR-DOCS-OSSIW08-961016, Oct. 16, 1996.
Arthur D. Little, Inc., Developing an Interface Spec Data Over Cable, Dec. 12, 1995.
Walters, Computer Telephone Integration, Chapters on The Computer and Telephony Environment, The Role of Voice and Image Processing Systems, and a Computer-Integrated Future, 1993.
Baldwin et al., Cable Communication Second Edition, Chapter on the Technological Future, 1988.
Grant, Cable Television, Chapter 24 Integrating Telephone Services, 1983.
Slater, Cable Television Technology, Chapter 9 Two-way cable systems—interactive services, 1988.
Kuska, Cable Modems: Current Technologies and Applications Advances in the Information Industry Series, Chapter on MCNS/DOCSIS Strategy and Execution, 1999.
Arthur D. Little, Inc., Task 2—Analysis of PCN for Cable: Alternative Scenarios for Further Analysis Cable Labs PCN/PCS System Integrator Projects, Feb. 12, 1992..
Arthur D. Little, Inc., Evolving PCN/PCS Switching and Control Architectures and Economics Concepts and Implications, Jan. 1992.
Arthur D. Little, Discussion Material Switching Architectures for PCN Project for Cable Labs Inc., Dec. 1991.

Norlite Technology, Inc., Alliance TeleServices System Documentation (Vienna Systems), May 1992.
VocalTec, Ltd., VocalTec Press Release: VocalTec Unveils Strategy To Bridge Old World of Telephony and New World of Internet Telephony; Launches First Bridging Applications, Aug. 1, 1996.
VocalTec, Ltd., VocalTec Press Release: VocalTec Introduces the Internet Phone Telephony Gateway Linking Traditional and Internet Telephone Networks, Mar. 8, 1996.
VocalTec, Ltd., VocalTec, Ltd. Internet Phone Release 4, 1997.
VocalTec, Ltd., VocalTec Telephony Gateway Product Component Description and Functional Specifications, 1993.
VocalTec, Ltd., VocalTec Telephony Gateway Next Generation Telephony, 1996.
VocalTec, Ltd., VocalTec Telephony Gateway Telephony Gateway Key Components, 1996.
VocalTec, Ltd., VocalTec Telephony Gateway Features, 1996.
VocalTec, Ltd., VocalTec Telephony Gateway System Requirements, 1996.
VocalTec, Ltd., VocalTec Telephony Gateway Calling Options, 1997.
VocalTec, Ltd., VocalTec Telephony Gateway Resources for Additional Information, 1996.
VocalTec, Inc., VocalTec Telephony Gateway Ordering, 1996.
VocalTec, Inc., Computer Telephony Article: VocalTec's Internet Telephony Gateway, 1996.
VocalTec, Ltd., VocalTec Telephony Gateway Frequently Asked Questions, 1996.
AT&T, AT&T TeleConference Service: Tips and Techniques, 1997.
AT&T, AT&T TeleConference Service: Dial-In/Operator Dialed, 1997.
AT&T, AT&T TeleConference Service: Executive Offerings, 1997.
AT&T, AT&T TeleConference Service: Host-Dialed, 1997.
AT&T, AT&T TeleConference Services: Making it Easy to "Meet With a Call", 1997.
AT&T, AT&T TeleConference Service: Overview, 1997.
AT&T, AT&T TeleConference Service: General Offerings, 1997.
AT&T, AT&T TeleConference Service: General Offerings Pricing Information, 1997.
AT&T, AT&T TeleConference Service: Executive Offerings Overview, 1997.
AT&T, AT&T TeleConference Service: Executive Offerings When Your Image is on the Line, 1997.
AT&T, AT&T TeleConference Service: Executive Offerings Impact on Your Business Decision, 1997.
AT&T, AT&T TeleConference Service: Executive Offerings Call Access Options and Key Capabilities, 1997.
AT&T, AT&T TeleConference Service, PHone on the range, AT&T Executive TeleConference Service Hosts Live Cattle Auction, 1997.
AT&T, AT&T Global Business Video Services, Entries in the AT&T WorldWorx Services Library, 1997.
AT&T, AT&T WorldWorx Personal Conferencing Service Offers You a Smarter, Faster; and More Cost-Effective Way to Get the Job Done, 1997.
AT&T, AT&T WorldWorx Services Global Business Video Servies Overview, 1997.
AT&T, AT&T Multipoint Control Unit Compatibility Standards Compliant CoDecs, 1997.
AT&T, AT&T Video Room Profile, 1997.
AT&T, AT&T Video Center Reservations Instructions, 1997.
AT&T, AT&T WorldWorx Services Personal Conferencing Service Customer Profile Form, 1997.
AT&T, AT&T WorldWorx Personal Conferencing Services Agreement, 1997.
AT&T, AT&T WorldWorx Network Services Global Business Video Services PictureTel and AT&T, 1997.
AT&T, AT&T WorldWorx Network Services Global Business Video Services VTEL and AT&T, 1997.
AT&T, AT&T WorldWorx Network Services Global Business Video Services CLI and AT&T, 1997.
AT&T, AT&T WorldWorx Compatible Partner Products Intel ProShare Personal Conferencing Video System 200, 1997.
AT&T, AT&T WorldWorx Compatible Partner Products Apple Quick Time Conferencing, 1997.
AT&T, Affinity VideoNet, Inc. Public Room Partners Video Conferencing Rates, 1997.
AT&T, AT&T Sales Resource List for Video Conferencing Services Sales Resource List for Videoconferencing Services, 1997.
AT&T, AT&T Global Business Video Services a Member of the AT&T WorldWorx Network Services Family Pharmaceutical and Consumer Products Industry: Warner-Lambert Company, 1997.
AT&T, AT&T Global Business Video Services a Member of AT&T WorldWorx Network Services Family Corporate Video Conferencing: Metropolitan Life, 1997.
AT&T, AT&T Global Business Video Services A Member of AT&T WorldWorx Network Services Family Multinational Project Engineering: ITT Automotive, 1997.
AT&T, AT&T Global Business Video Services A Member of AT&T WorldWorx Network Services Family Market Research Videoconferencing: FocusVision Network, Inc., 1997.
AT&T, The Basics of VideoConferencing, 1997.
AT&T, Preparing to VideoConference, 1997.
AT&T, Tips for Successful VideoConferencing, 1997.
AT&T, Managing Multipoint VideoConferences, 1997.
AT&T, Simplified Gateway and Conversion Services, 1997.
AT&T, Inverse Multiplexing, 1997.
AT&T, AT&T TeleConference Service: Testimonials, 1997.
AT&T, AT&T TeleConference Service at American Airlines, 1997.
AT&T, AT&T TeleConference Service at Caliber Technology, 1997.
AT&T, AT&T TeleConference Service at CourtCall, 1997.
AT&T, AT&T TeleConference Service at Entergy Corporation, 1997.
AT&T, AT&T TeleConference Service and the Focolare Movement, 1997.
AT&T, AT&T TeleConference Service at Installers Service Warehouse, 1997.
AT&T, AT&T TeleConference Service at National Car Rental, 1997.
AT&T, AT&T TeleConference Service at National Committee to Prevent Child Abuse, 1997.
AT&T, AT&T TeleConference Service at Transport Corporation, 1997.
Walters, Computer Telephone Integration, Table of Contents, 1993.
IEEE, Cable Modems: Current Technologies and Applications, Table of Contents, 1999.
Grant, Cable Television, Table of Contents, 1983.
Kuo, Protocols and Techniques for Data Communication Networks, Table of Contents, 1981.
Baldwin et al., Cable Communication Second Edition, Table of Contents, 1988.
Slater, Cable Television Technology, Table of Contents, 1988.
Ensor et al., The Rapport Multimedia Conferencing System—A Software Overview, 1988.
Ahuja et al., Networking Requirements of the Rapport Multimedia Conferencing System, 1988.
Ahuja et al., Supporting Multi-Phase Groupware Over Long Distance, 1989.
Ensor et al., Control Issues in Multimedia Conferencing, 1991.
Ensor et al., User Interfaces for Multimedia Multiparty Communications, 1993.
Ahuja et al., The Rapport Multimedia Conferencing System, 1988.
Ahuja et al., Call and Connection Management: Making Desktop Conferencing Systems a Real Service, The European "MIAS" System for ISDN Multimedia Conferencing, 1992.
Wintrob, Northern, DEC in call centre link. (will connect DEC's Computer Integrated Telephony and Northern Telcom's DMS-100 central switch) (Connectivity), Oct. 24, 1991.
Rohde, NetWare CTI Applications to be Available Over Centrex, Feb. 11, 1996.
Doss, SCAI Expands the Public Network, Nov. 12, 1990.
IBM, CallPath Services Reference for Northern Telcom DMS-100 CO Switch, Aug. 3, 1995.
IBM, AS/400 CallPath/400 Programmer's Reference, 1994.
IBM, CallPath Server General Information, Aug. 5, 1995.
IBM, Planning, Installation, and Problem Determination Guide, Aug. 5, 1995.
IBM, CallPath Developers Toolkit, Aug. 5, 1995.
Lucent Technologies, First of Many AT&T Products for New Multimedia Networks, Oct. 30, 1995.

Wintrob, Northern, DEC in Call Centre Link, Oct. 24, 1991.
Business Wire, Micom Unveils New Integration Router Family at ComNet, Jan. 24, 1995.
Blankenhorn, AT&T and Micom Announce ISDN Card for Personal Computers, May 15, 1990.
Endrijonas, Micom Has Way to Lower Office Communication Needs, Nov. 28, 1990.
Rohrbough, Free Ride for Calls and Faxes with Micom's New Device, Apr. 12, 1991.
AWingrove, Micom Claims to Eliminate IDD Phone Charges for Asia Users, May 10, 1991.
Rohrbough, Micom Intros Analogue/Digital Network Product, Aug. 14, 1991.
Cameron, New for Networks: NetRunner Ethernet Bridge, Sep. 16, 1992.
Blankenhorn, Micom Releases Voice Piggyback System, Oct. 15, 1993.
Csenger, Micom Introduces High-End NetRunner Bridge/Multiplexer, Jul. 1994.
Csenger, Micom Triples Capacity of Data/Voice Mux, Oct. 1994.
Csenger, Micom Boost Voice Compression, Adds Fax Feature to Muxes, Nov. 1994.
Business Wire, Micom Debuts High-Capacity Data/Voice Integration Headquarters Solution, Nov. 14, 1994.
Csenger, Micom Adds WAN Routing to Substrate Muxes, Jan. 1995.
Business Wire, New EasyRouter Technology From Micom Delivers "No Tears" Routing, Jan. 24, 1995.
Greene, Micom Adds Frame Relay to Multiplexer and Router Lines, Aug. 1995.
Business Wire, Micom Integrates Voice and Fax with Lan and Data Over Public Frame Relay, Aug. 28, 1995.
Business Wire, Micom Website Loaded with Product Info, News and Customer Application Stories, Oct. 13, 1995.
Business Wire, Micom Earns ISO 9001 Certification, Jan. 15, 1996.
Business Wire, Micom Achieves MCI Certification for Frame Relay Products, Jan. 22, 1996.
Business Wire, Micom Announces High-Speed Digital Modules for Marathon and NetRunner Integration Products, Jan. 29, 1996.
Greene, Tim, Voice to Get Free Ride From Frame, Jan. 1996.
Business Wire, Micom Adds New Network Feeder Products for Data Voice WAN Integration, Jan. 30, 1996.
Business Wire, Micom Certified by EMI for Voice Over Frame Relay, Feb. 14, 1996.
Business Wire, Micom: First with New G.729 CS-ACELP Voice Compression, Mar. 29, 1996.
Business Wire, Micom Increases Network Performance in Leased Line and Public Frame Relay Networks, Apr. 2, 1996.
Business Wire, LAN Magazine Product of the Year: Micom NetRunner Integration Router, Apr. 24, 1996.
Business Wire, Micom Launches Enhanced Sales Channel Program for US Market, Aug. 6, 1996.
Greene, Tim, Will Voice Over IP Turn the Telephony Mart on Its Ear?, Aug. 1996.
Business Wire, Micom's New V IP Product Family Adds Voice Fax to Enterprise IP Networks, Sep. 3, 1996.
Greene, Neura Boosts Bandwidth for Voice Over Frame, Oct. 1996.
Business Wire, Micom's Marathon Rated Best Value, Oct. 15, 1996.
Business Wire, Micom Voice Exceeds Toll-Quality, Oct. 16, 1996.
Greene, Voice of IP is Sounding Better, Nov. 1996.
Business Wire, Micom Announces New Low-cost ClearVoice Module for Marathon Product Line, Dec. 4, 1996.
Business Wire, Micom Showcases New V/IP Phone/Fax IP Gateway at Internet World, Dec. 11, 1996.
Michalski, Shared Spaces / Virtual / Includes Related Article on TCP/IP / Industry Trend or Event, Nov. 11, 1995.
Katz et al., MMCX Server Delivers Multimedia Here and Now, Dec. 1995.
Foard et al., Switch-to-Computer Networking in the Nineties: The Evolution of AT&T's Switch-Computer Interfaces, Sep. 1991.
AT&T, Press Release re: Alliance Dedicated Teleconferencing Service 1, Oct. 15, 1984.
AT&T, Press Release re: Alliance Dedicated Teleconferencing Service 2, Oct. 15, 1984.
AT&T, Press Release re: Alliance Dedicated Teleconferencing Service 3, Oct. 15, 1984.
AT&T, Press Release re: Alliance Dedicated Teleconferencing Service 1, Jan. 3, 1985.
AT&T, Press Release re: Alliance Dedicated Teleconferencing Service 2, Jan. 3, 1985.
Fischell, Advances in Audiographic Communication Technology 1, Nov. 13, 1987.
Fischell, Advances in Audiographic Communication Technology 2, Nov. 13, 1987.
BNR, Telesis One Cover, 1987.
BNR, Telesis One Table of Contents, 1987.
Kemp et al., Telesis One Enhanced Multiparty Communications, 1987.
Wang, Press Release re: Wang Breaks New Ground in Voice/Data Integration, Sep. 24, 1986.
Wang, Press Release re: Wang Breaks New Ground in Voice/Data Integration 2, Sep. 24, 1986.
Wang, Press Release re: Wang Breaks New Ground in Voice/Data Integration 3, Sep. 24, 1986.
Horn et al., A Versatile Audio Bridge for Multimedia Conferencing, 1994.
Wellner et al., Conference Scribe: Turning Conference Calls into Documents, 2001.
Hoberecht, A Layered Network Protocol for Packet Voice and Data Integration, 1983.
Jenq, Performance Analysis of a Packet Switch Based on Single-Buffered Banyan Network, 1983.
Montgomery, Techniques for Packet Voice Synchronization, 1983.
Barberis et al., Coded Speech in Packet-Switched Networks: Models and Experiments, 1983.
Ueda et al., Evalution of an Experimental Packetized Speech and Data Transmission System, 1983.
Musser et al., A Local Area Network as a Telephone Local Subscriber Loop, 1983.
Elhakeem et al., Spread-Spectrum Access to Mixed Voice-Data Local Area Networks, 1983.
DeTreville et al., A Distrubuted Experimental Communications System, 1983.
Galk et al., Integration of Voice and Data in the Wideband Packet Satellite Network, 1983.
Shacham et al., Speech Transport in Packet-Radio Networks with Mobile Nodes, 1983.
Mahmoud et al., An Integrated Voice/Data System for VHF/UHF Mobile Radio, 1983.
Arthurs et al., Traffic Analysis Tools for Integrated Digital Time-Division Link Level Multiplexng of Synchronous and Asynchronous Message Streams, 1983.
Sriram et al., Discrete-Time Analysis of Integrated Voice/Data Multiplexers With and Without Speech Activity Detectors, 1983.
Kim, Characterization of Arrival Statistics of Multiplexed Voice Packets, 1983.
Foreword: Voice by the Packet? , 1983.
Weinstein., Experience with Speech Communication in Packet Networks, 1983.
Gruber et al., Performance Requirements for Integrated Voice/Data Networks, 1983.
IEEE Communications Society Editorial Staff 1983, Dec. 1993.
IEEE, Selected Areas in Communications Dec. 1993.
Business Wire, Micom's New V/IP Product Family Adds Voice Fax to Enterprise IP Networks, Sep. 3, 1996.
Network World, Will Voice Over IP Turn the Telephony Mart on Its Ear?, Aug. 19, 2006.
Margulies, Ed, Table of Contents: Understanding the Voice-Enabled Internet, Aug. 1996.
Bell System Technical Journal, Various Articles: 4ESS, Dec. 1977.
Bell System Technical Journal, Common Channel Interoffice Signaling: No. 4ESS Application, Feb. 1978.
Bell System Technical Journal, Various Articles: 4ESS, Jul. 1981.
Business Wire, AT&T to Integrate Web and Long-Distance Network to Let Surfers Click to Talk to a Service Agent, Aug. 27, 1996.
Business Wire, Talk is Cheap—At Least Frame Relay Lines, Feb. 5, 1996.

Business Wire, Frame Relay Gives Bassett Healthy Return, Aug. 26, 1996.
Haszto et al., Alliance Teleconferencing Services Boost Business Efficiency, 1988.
Denker, E-Mail re: Click to Dial, Jan. 1, 1995.
Wellner, E-Mail re: Click to Dial, Jan. 24, 1995.
Ninkie et al., WebRooms, Mar. 3, 1995.
Wellner et al., WebRooms: Controlling Conference Calls with the Web, Oct. 1996.
PlayPen/WebPen Project Update, 1995.
AT&T TeleConference Service On-Line Trial Information, Oct. 9, 1996.
IDT's Net2Phone Partners with Daewoo, Mar. 8, 1997.
Email Re: International Discount Telecommunications, Jan. 3, 1996.
Packet Cable™ Architecture Call Flows Technical Report, On-Net MTA to On-Net MTA, Aug. 15, 2003.
Packet Cable™ Architecture Call Flows Technical Report, On-Net MTA to PSTN Telephone, Aug. 15, 2003.
Packet Cable™ Architecture Call Flows Technical Report, PSTN Telephone to On-Net MTA, Aug. 15, 2003.
Claim Construction Order, Oct. 18, 2006, in *Caritas Technologies,. Inc.'s v. Comcast Corporation*, U.S. District Court for the Eastern District of Texas Marshall Division, 2:05-CV-339-DF.
Comcast Corporation's First Supplemental Respsonse to Caritas Technologies, Inc.'s Interrogatory No. 12, Aug. 9, 2006, in *Caritas Technologies,. Inc's v. Comcast Corporation*, U.S. District Court for the Eastern District of Texas Marshall Division, 2:05-CV-339-DF.
Comcast Corporation's Second Supplemental Response to Caritas Technologies, Inc.'s Interrogatory No. 12, Aug. 22, 2006, in *Caritas Technologies,. Inc. 's v. Comcast Corporation*, U.S. District Court for the Eastern District of Texas Marshall Division, 2:05-CV-339-DF.
Defendant Comcast Corporation's Responses to Plaintiff Caritas Technologies, Inc.'s First Set of Interrogatories, Nov. 28, 2005, in *Caritas Technologies,. Inc. 's v. Comcast Corporation*, U.S. District Court for the Eastern District of Texas Marshall Division, 2:05-CV-339-DF.
Defendant Comcast Corporation's Preliminary Construction and Citations to Extrinsic Evidence for Claim Terms from the '779 Patent, Jan. 9, 2006, in *Caritas Technologies,. Inc.'s v. Comcast Corporation*, U.S. District Court for the Eastern District of Texas Marshall Division, 2:05-CV-339-DF.
Plaintiff Caritas Technologies, Inc.'s Answers and Objections to Defendant, Comcast Corp.'s First Set of Interrogatories, Jan. 26, 2007, in *Caritas Technologies,. Inc.'s v. Comcast Corporation*, U .S . District Court for the Eastern District of Texas Marshall Division, 2:05-CV-339-DF.
Defendant Comcast Corporation's Responses to Plaintiff Caritas Technologies, Inc's Second Set of Interrogatories, Mar. 22, 2006, in *Caritas Technologies, Inc.'s v. Comcast Corporation*, U.S. District Court for the Eastern District of Texas Marshall Division, 2:05-CV-339-DF.
Plaintiff Caritas Technologies, Inc.'s Supplemental Answers and Objections to Defendant, Comcast Corp.'s First Set of Interrogatories, Nos. 1-7, Mar. 27, 2006, in *Caritas Technologies,. Inc.'s v. Comcast Corporation*, U.S. District Court for the Eastern District of Texas Marshall Division, 2:05-CV-339-DF.
Plaintiff Caritas Technologies, Inc.'s Preliminary Claim Construction and Extrinsic Evidence, Patent Local Rule 4-2. Apr. 6, 2006, in *Caritas Technologies, Inc.'s v. Comcast Corporation*, U.S. District Court for the Eastern District of Texas Marshall Division, 2:05-CV-339-DF.
Defendant Comcast Corporation's Third Set of Supplemental Responses to Plaintiff Caritas Technologies, Inc.'s First Set of Interrogatories, Apr. 14, 2006, in *Caritas Technologies,. Inc. 's v. Comcast Corporation*, U.S. District Court for the Eastern District of Texas Marshall Division, 2:05-CV-339-DF.
Joint Claim Construction and Pre-hearing Statement Local Patent Rule 4-3, Apr. 21, 2006, in *Caritas Technologies, Inc.'s v. Comcast Corporation*, U.S. District Court for the Eastern District of Texas Marshall Division, 2:05-CV-339-DF.
Defendant Comcast Corporation's Fourth Set of Supplemental Responses to Plaintiff Caritas Technologies, Inc.'s First Set of Interrogatories, May 12, 2006, in *Caritas Technologies,. Inc. 's v. Comcast Corporation*, U.S. District Court for the Eastern District of Texas Marshall Division, 2:05-CV-339-DF.
Caritas' Opening Claim Construction Brief, Jun. 9, 2006, in *Caritas Technologies, Inc.'s v. Comcast Corporation*, U.S. District Court for the Eastern District of Texas Marshall Division, 2:05-CV-339-DF.
Appendix in Support of Caritas' Opening Claim Construction Brief, Jun. 9, 2006, in *Caritas Technologies, Inc.'s v. Comcast Corporation*, U.S. District Court for the Eastern District of Texas Marshall Division, 2:05-CV-339-DF.
Declaration of Leonard J. Forys in Support of Caritas' Opening Claim Construction Brief, Jun. 9, 2006, in *Caritas Technologies, Inc.'s v. Comcast Corporation*, U.S. District Court for the Eastern District of Texas Marshall Division, 2:05-CV-339-DF.
Defendant Comcast Corp.'s Reponses to Plaintiff Caritas Technologies, Inc.'s Third Set of Interrogatories, Jun. 12, 2006, in *Caritas Technologies, Inc.'s v. Comcast Corporation*, U.S. District Court for the Eastern District of Texas Marshall Division, 2:05-CV-339-DF.
Defendant Comcast Corp.'s Claim Construction Brief, Jun. 23, 2006, in *Caritas Technologies, Inc.'s v. Comcast Corporation*, U.S. District Court for the Eastern District of Texas Marshall Division, 2:05-CV-339-DF.
Declaration of Asim M. Bhansali in Support of Defendant Comcast Corp.'s Claim Construction Brief, Jun. 23, 2006, in *Caritas Technologies,. Inc.'s v. Comcast Corporation*, U.S. District Court for the Eastern District of Texas Marshall Division, 2:05-CV-339-DF.
Caritas' Reply Claim Construction Brief, Jun. 30, 2006, in *Caritas Technologies, Inc.'s v. Comcast Corporation*, U.S. District Court for the Eastern District of Texas Marshall Division, 2:05-CV-339-DF.
Appendix in Support of Caritas' Reply Claim Construction Brief, Jun. 30, 2006, in *Caritas Technologies, Inc.'s v. Comcast Corporation*, U.S. District Court for the Eastern District of Texas Marshall Division, 2:05-CV-339-DF.
Declaration of Leonard J. Forys in Support of Caritas' Reply Claim Construction Brief, Jun. 30, 2006, in *Caritas Technologies, Inc.'s v. Comcast Corporation*, U.S. District Court for the Eastern District of Texas Marshall Division, 2:05-CV-339-DF.
Joint Claim Construction Charts, Jul. 17, 2006, in *Caritas Technologies, Inc.'s v. Comcast Corporation*, U.S. District Court for the Eastern District of Texas Marshall Division, 2:05-CV-339-DF.
Markman Hearing, Jul. 31, 2006, in *Caritas Technologies, Inc.'s v. Comcast Corporation*, U.S. District Court for the Eastern District of Texas Marshall Division, 2:05-CV-339-DF.
Defendant Comcast Corp.'s Fifth Supplemental Response to Plaintiff Caritas Technologies, Inc.'s Interrogatory No. 8, Aug. 22, 2006, in *Caritas Technologies, Inc.'s v. Comcast Corporation*, U.S. District Court for the Eastern District of Texas Marshall Division, 2:05-CV-339-DF.
Opening Expert Report of Dr. Patrick E. White, Sep. 28, 2006, in *Caritas Technologies, Inc.'s v. Comcast Corporation*, U.S. District Court for the Eastern District of Texas Marshall Division, 2:05-CV-339-DF.
Opening Expert Report of Dr. Pierce D. Wellner, Sep. 28, 2006, in *Caritas Technologies, Inc.'s v. Comcast Corporation*, U.S. District Court for the Eastern District of Texas Marshall Division, 2:05-CV-339-DF.
Opening Expert Report of Larry L. Campbell, Sep. 28, 2006. in *Caritas Technologies, Inc.'s v. Comcast Corporation*, U.S. District Court for the Eastern District of Texas Marshall Division, 2:05-CV-339-DF.
Expert Report of Mark E. Nusbaum, Sep. 28, 2006, in *Caritas Technologies, Inc.'s v. Comcast Corporation*, U.S. District Court for the Eastern District of Texas Marshall Division, 2:05-CV-339-DF.
Rebuttal Expert Report of Charles E. Van Horn, Oct. 16, 2006, in *Caritas Technologies, Inc.'s v. Comcast Corporation*, U.S. District Court for the Eastern District of Texas Marshall Division, 2:05-CV-339-DF.
Report of Dr. Leonard J. Forys, Oct. 16, 2006, in *Caritas Technologies, Inc.'s v. Comcast Corporation*, U.S. District Court for the Eastern District of Texas Marshall Division, 2:05-CV-339-DF.
Defendant Comcast Corp.'s Supplemental Response to Plaintiff Caritas Technologies, Inc.'s Interrogatory No. 13, Oct. 18, 2006, in

*Caritas Technologies, Inc.'s* v. *Comcast Corporation*, U.S. District Court for the Eastern District of Texas Marshall Division, 2:05-CV-339-DF.
Defendant Comcast Corp.'s Second Supplemental Response to Plaintiff Caritas Technologies, Inc.'s Interrogatory No. 7, Oct. 19, 2006 in *Caritas Technologies, Inc.'s* v. *Comcast Corporation*, U.S. District Court for the Eastern District of Texas Marshall Division, 2:05-CV-339-DF.
Dialogic, Product Description: Dialogic CT Connect, Version 1.0, Jul. 1995.
DEC, Computer Integrated Telephony (CIT) Linking Voice Switches to Digital Computers: Standards-Based, Open Platform for Call Center Solutions, 1991.
DEC, Software Product Description: DEC Computer Integrated Telephony Application Interface for ULTRIX, Version 3.0, Sep. 1991.
DEC, Software Product Description: DEC Computer Integrated Telephony Server 100/500, Version 1.0, Sep. 1991.
DEC, CallCenterPLUS: Taking a Closer Look at the Next Generation Call Center, 1993.
DEC, CIT Applications Interface for Microsoft Windows: Full-Featured Telephone Integration for the Desktop, 1993.
Fallgatter et al., Dataquest Perspective: Switch-to-Host Interfaces: An Overview of the Technology, Standards, and Applications, Feb. 22, 1991.
Rasmus, Dataquest Perspective: The Switch-Computer Integration Market-A New Silver Bullet of Just Another Niche? Jul. 13, 1992.
The Aries Group, "*More About DEC's CallCenterPLUS*", Telecommunications Product Review, vol. XIX, No. 12, pp. 1-4, Dec. 1992.
DEC, Fax re: DEC CIT Profile, Jul. 26, 1990.
DEC, Digital's Computer Integrated Telephony Platform: Functionally Integrated Voice/Data Solutions, 1991.
DEC / Nortel, Press Conference and Demos: DEC's CIT Program and Products and Nortel's ISDN/AP Protocol, Mar. 14, 1989.
DEC, Diagram: Typical CIT Configuration, Mar. 14, 1989.
Nortel, Press Release: Northern Telecom Announces Availability of ISDN Applications Protocol Software, Mar. 14, 1989.
DEC, Press Release: Digital and Northern Telecom Announce Communications Capabilities for Enterprise-Wide Integration of Voice and Data, Mar. 14, 1989.
DEC, Collection of News Articles (SS7), Mar. 1989.
DEC, 1. Cover Memo 2. Collection of News Articles, Apr. 4, 1989.
DEC, DEC CIT Applications Interface for ULTRIX Programming Reference (E-9 to F-22), Oct. 1991.
AT&T, AT&T to Integrate Web and Long Distance Network to Let Surfers Click to Talk to a Service Agent, Aug. 27, 1996.
Simpson, RFC 1661: The Point-to-Point Protocol (PPP), Jul. 1994.
Macedonia et al., MBone Provides Audio and Video Across the Internet, Apr. 1994.
Motion for Entry of Judgment Pursuant to Rule 54(b), for Certification of Appeal, and to Stay Further Proceedings Pending Appeal, Oct. 23, 2006, in *Caritas Technologies, Inc. 's* v. *Comcast Corporation*, U.S. District Court for the Eastern District of Texas Marshall Division, 2:05-CV-339-DF.
(Proposed) Final Judgment of Non-Infringement, Oct. 23, 2006, in *Caritas Technologies, Inc. 's* v. *Comcast Corporation*, U.S. District Court for the Eastern District of Texas Marshall Division, 2:05-CV-339-DF.
Joint Submission in Response to Order Setting a Hearing on the Parties' Joint Motion for Entry of Judgment Pursuant to Rule 54(b),for Certification of Appeal, and to Stay Further Proceedings Pending Appeal, Nov. 6, 2006, in *Caritas Technologies, Inc.'s* v. *Comcast Corporation*, U.S. District Court for the Eastern District of Texas Marshall Division, 2:05-CV-339-DF.
Order Granting Motion for Entry of Judgment Under Rule 54(b) and Administratively Closing Cased, Nov. 9, 2006, in *Caritas Technologies, Inc. 's* v. *Comcast Corporation*, U.S. District Court for the Eastern District of Texas Marshall Division, 2:05-CV-339-DF.
Order regarding Joint Motion for Entry of Judgment Under Rule 54(b) signed by Judge Folsom, Nov. 9, 2006 in *Caritas Technologies, Inc.'s* v. *Comcast Corporation*, U.S. District Court for the Eastern District of Texas Marshall Division, 2:05-CV-339-DF.

Final Judgment of Non-Infringement signed by Judge Folsom, Nov. 9, 2006 in *Caritas Technologies, Inc. 's* v. *Comcast Corporation*, U.S. District Court for the Eastern District of Texas Marshall Division, 2:05-CV-339-DF.
Brief of Plaintiff-Appellant Caritas Technologies, Inc., Jan. 19, 2007, in *Caritas Technologies, Inc. 's* v. *Comcast Corporation*, U.S. Court of Appeals for the Federal Circuit, 2:05-CV-339-DF.
Brief of Appellees, Mar. 5, 2007, in *Caritas Technologies, Inc. 's* v. *Comcast Corporation*, U.S. Court of Appeals for the Federal Circuit, 2:05-CV-339-DF.
Reply Brief of Plaintiff-Appellant Caritas Technologies, Inc., Mar. 22, 2007, in *Caritas Technologies, Inc. 's* v. *Comcast Corporation*, U.S. Court of Appeals for the Federal Circuit, 2:05-CV-339-DF.
Videotaped Deposition of Gary Mason, Aug. 15, 2006, in *Caritas Technologies,. Inc. 's* v. *Comcast Corporation*, U.S. District Court for the Eastern District of Texas Marshall Division, 2:05-CV-339-DF. (redacted).
Videotaped Deposition of John F. Klos, vol. 1 & 2, Apr. 5, 2006, in *Caritas Technologies,. Inc. 's* v. *Comcast Corporation*, U.S. District Court for the Eastern District of Texas Marshall Division, 2:05-CV-339-DF. (redacted).
Videotaped Deposition of Meryl Natchez, Aug. 17, 2006, in *Caritas Technologies,. Inc. 's* v. *Comcast Corporation*, U.S. District Court for the Eastern District of Texas Marshall Division, 2:05-CV-339-DF. (redacted).
Video Deposition of David Jack Farber, Aug. 30, 2006, in *Caritas Technologies, Inc. 's* v. *Comcast Corporation*, U.S. District Court for the Eastern District of Texas Marshall Division, 2:05-CV-339-DF. (redacted).
Videotaped Deposition of Tice DeYoung, Sep. 8, 2006, in *Caritas Technologies, Inc. 's* v. *Comcast Corporation*, U.S. District Court for the Eastern District of Texas Marshall Division, 2:05-CV-339-DF. (redacted).
Videotaped Deposition of Clark E. Johnson, vol. 1 & 2, Mar. 24, 2006, in *Caritas Technologies, Inc. 's* v. *Comcast Corporation*, U.S. District Court for the Eastern District of Texas Marshall Division, 2:05-CV-339-DF. (redacted).
Videotaped Deposition of Daniel Robbins, Apr. 5, 2006, in *Caritas Technologies, Inc. 's* v. *Comcast Corporation*, U.S. District Court for the Eastern District of Texas Marshall Division, 2:05-CV-339-DF. (redacted).
Videotaped Deposition of Richard J. Solomon, vol. 1 & 2, Sep. 12, 2006, in *Caritas Technologies, Inc. 's* v. *Comcast Corporation*, U.S. District Court for the Eastern District of Texas Marshall Division, 2:05-CV-339-DF. (redacted).
Videotaped Deposition of Derek E. Miller, Sep. 15, 2006, in *Caritas Technologies, Inc. 's* v. *Comcast Corporation*, U.S. District Court for the Eastern District of Texas Marshall Division, 2:05-CV-339-DF. (redacted).
"*New Technology Lets PC Call Telephones*", Investor's Business Daily, Oct. 25, 1995.
"*Emerging Technology Review*, vol. 1", Salomon Smith Barney, Dec. 11, 2001.
Goralski et al., "*IP Technology*", McGraw Hill, 2000.
Leiden et al., "*TCP/IP for Dummies*", 4th Edition, IBM, 2000.
Sheldon, "*Encyclopedia of Networking & Telecommunications*", McGraw Hill, 2001.
Sackett, "*Cisco Router Handbook*", McGraw Hill, 2000.
Baldwin, T.F., and D.S. McVOY, "Cable Communication," Table of Contents, Prentice-Hall, 1981.
Baldwin, T.F., and D.S. McVOY, "Cable Communication," Second Edition, Chapter on the Technological Future, Prentice-Hall, 1988.
Barberis, G., et al., "Coded Speech in Packet Switched Networks: Models and Experiments," IEEE Journal on Selected Areas of Communication, Dec., 1983, pp. 1028-1038.
"DEC Computer Integrated Telephony (CIT) Linking Voice Switches to Digital Computers: Standards Based, Open Platform for Call Center Solutions," Digital Equipment Corporation (DEC). 1991.

"DEC Computer Integrated Telephony Application Interface for ULTRIX," Version 3.0, Digital Equipment Corporation (DEC) Sep. 1991.

"Dialogic CT Connect," Version 1.0, Dialogic, Jul. 1995.

Ensor et al., "The Rapport Multimedia Conferencing System A Software Overview," 1988.

Ensor et al., "Control Issues in Multimedia Conferencing," 1991.

Ensor et al., "User Interfaces for Multimedia Multiparty Communications," 1993.

Faynberg, et al., "A Proposal for Internet and Public Switched Telephone Networks (PSTN) Internetworking," Network Working Group, Mar. 1997, pp. 1-10.

"First of Many AT&T Products for New Multimedia Networks," Lucent Technologies, Oct. 1995.

Grant, "Cable Television," Integrating Telephone Services, Chapter 24, 1983.

Greene,T., "Micom Adds Frame Relay to Multiplexer and Router Lines," Network World, Aug. 1995.

Greene, T., "Neura Boosts Bandwidth for Voice Over Frame," Network World, Oct. 1996.

Greene, T., "Voice of IP Is Sounding Better," Network World, 1996.

IEEE, "Selected Areas in Communications," Dec. 1993.

Jenq, "Performance Analysis of a Packet Switch Based on Single Buffered Banyan Network," 1983.

Jesitus, J., "Putting Voice and Data on Same Road," Communication News, Jul. 1990.

Margulies, E., "Understanding the Voice Enabled Internet," Table of Contents, Flatiron Publishing, New York, 1996.

Michalski: "Shared Spaces/Virtual I Includes Related Article on TCP/IP/Industry Trend or Event," 1995.

"Micom's New V/IP Product Family Adds Voice Fax to Enterprise Ip Networks," Business Wire, Sep. 1996.

"Nortel Technical Training: VIP Net Voice," Nortel Networks Corporation.

"Nortel Mod Tap Cabling Solutions Ordering Information," Nortel Networks Corporation, Mar. 1995.

"Nortel Mod Tap Cabling Solutions Overview," Nortel Networks Corporation, Mar. 1995.

"Nortel Marathon 5KT Pro Owner's Manual 13 Release 5.1 and Above," Nortel Networks Corporation, 1996.

"Nortel V/Ip Phone/Fax IP Gateway Analog Voice Interface Cards for Netware and MS DOS User's Manual (Preliminary)," Nortel Networks Corporation, Aug. 1996.

"Nortel Networks™ Universal Signaling Point for Seamless Interworking," Product Brief, Nortel Networks Corporation, Jan. 2000, 4 pages.

"Telephony Services 2.1," Computer Telephony, Aug. 1995, pp. 34, 39-41.

"Tutorial on Signaling System 7 ( SS7)," Performance Technologies, Inc., Jan. 2000, 23 pages.

"Voice Over IP Taps Intranet for Telephone Service," Cisco World, 1996.

Wexler, J., "Industry Gets Serious About 'Net Phone Calls," InfoWorld, 1996, p. 39.

"Will Voice Over IP Turn the Telephony Mart on Its Ear?" Business Wire, Aug. 1996.

"Nortel Marathon Release 5.0 Startup Guide for Marathon 2K, Marathon 2K Plus and Marathon 3K," Nortel Networks Corporation, Apr. 1996.

"Novell NetWare Telephony Services 2.21 / LAN Times: Starting Small, Thinking Big," 1996.

Ahuja, Sr., and J.R. Ensor, "Call and Connection Management: Making Desktop Conferencing Systems a Real Service," ACM SIGCOMM Computer Communication Review 22(3):10-13, Jul. 1992.

Ahuja, Sr., and J.R. Ensor, "Coordination and Control of Multimedia Conferencing," IEEE Communications Magazine 30(5):38-43, May 1992.

"AT&T's Transformation Strategy" (produced in response to subpoena in *Caritas* v. *Comcast*), available as early as May 8, 2007, pp. 1-11.

"Competitive Products for the Pandora Technologies EZSpeak System," available as early as May 8, 2007, 3 pages.

"Corvette Dealer Races to Savings on Multi-Use Network (Modems & Muxes; Visone Motors of Saugus, MA," Communication News, vol. 29, No. 2, Feb. 1992, 2 pages.

"V/IP (Voice Over IP) Phone/Fax IP Gateway User's Manual," MICOM Communications Corp., available as early as May 8, 2007, 93 pages.

"Digital Conferencing and Switching System 240e-ns (DCSS 240e-ns)," DynaLec Corporation, available as early as May 8, 2007, 3 pages.

Edwards, M., "Micro-to-Mainframe Links Are Forged by Stream of Products," Communication News, Mar. 1985, 11 pages.

Harler, C., "Phillies Network is Hard-Hitting and Error-Free (Philadelphia Phillies Use Local Area Network for Automated Ticketing System)," Communication News, vol. 30, No. 11, Nov. 1993, 2 pages.

IEEE Journal on Selected Areas in Communications SAC-1(6), Dec. 1983, 2 pages.

Jesitus, J., "Putting Voice and Data on Same Road," Communication News, vol. 27, No. 7, Nov. 1993, 3 pages.

Kim, B.G., "Characterization of Arrival Statistics of Multiplexed Voice Packets," IEEE Journal on Selected Areas in Communications SAC-1(6):1133-1139, Dec. 1983.

Lucent Technologies, "MultiMedia Communications eXchange: Local and Wide Area Network Considerations—a MultiMedia Communications Exchange White Paper," 1996, pp. 1-11.

MICOM Technical Training, "Enterprise V/IP—Voice Over IP," available as early as Aug. 25, 1997, 14 pages.

MICOM Technical Training, Instructor's Copy, "V/IP—Phone/Fax IP Gateway," available as early as Aug. 25, 1997, 15 pages.

MICOMTechnical Training, "V/IP—Phone/Fax IP Gateway—V/IP Analog/T1/E1—DOS/Netware/WIN95," Aug. 25, 1997, 18 pages.

MICOM Technical Training, "VIP NetVoice," available as early as Aug. 25, 1997, 55 pages.

Lucent Technologies, "MultiMedia Communications eXchange System Administrator's Guide and Technical Reference Manual," Release 2.0M 555-027-813, Issue 1, Jul. 1997, 2 pages.

Net2Phone Communications Without Borders, "Phone to Phone" <http://www.net2phone.com/about/press/ pressmaterials/p2p.asp> [retrieved Oct. 10, 2011], 1 page.

Net2Phone Communications Without Borders, "PC to Phone" <http://www.net2phone.com/about/press/pressmaterials/pc2p.asp> [retrieved Oct. 10, 2011], 1 page.

Nortel, "Magnum Router User's Guide Release 2.0," available as early as May 8, 2007, 171 pages.

Novell, "NetWare 4.1 Release Notes," available as early as May 8, 2007, 24 pages.

Parameshwar, N., and C. Reece, "Advanced SIP Series: SIP and 3GPP," Award Solutions, Inc., retrieved Feb. 25, 2011, pp. 1-9.

"Platform SDK: Telephony Application Programming Interfaces," retrieved on or before Jul. 22, 2010, 24 pages.

"VocalTec Announces Support of H.323 Standard: Demonstrates Internet Phone Interoperability With Microsoft, Intel," PR Newswire, Oct. 31, 1996, 3 pages.

"VocalTec Introduces the Internet Phone Telephony Gateway Linking Traditional and Internet Telephone Networks," PR Newswire, Mar. 8, 1996, 3 pages.

"VocalTech Unveils Real World Internet Telephony," Newsbytes, Aug. 30, 1996, 2 pages.

Green, T., "Voice to Get Free Ride From Frame," Network World, Jan. 29, 1996, 1 page.

* cited by examiner ns, which:
DIAL UP TELEPHONE CONFERENCING SYSTEM CONTROLLED BY AN ONLINE COMPUTER NETWORK This application is a continuation of application Ser. No. 10/705,571, filed Nov. 10, 2003, and now U.S. Pat. No. 7,522,542, which is hereby incorporated by reference herein in its entirety and was a continuation of application Ser. No. 10/087,671, filed Mar. 1, 2002, and now U.S. Pat. No. 6,661,779, which was a continuation of application Ser. No. 09/819,079, filed Apr. 30, 2001, and now U.S. Pat. No. 6,480,474, which was a continuation of application Ser. No. 09/587,080, filed Jun. 3, 2000, and now U.S. Pat. No. 6,266,328, which was a continuation-in-part of application Ser. No. 09/212,786, filed Dec. 16, 1998, and now U.S. Pat. No. 6,072,780, which was a continuation-in-part of application Ser. No. 08/918,564, filed Aug. 22, 1997, now abandoned which claimed the benefit of priority pursuant to 35 U.S.C. §119 of Provisional Application 60/024,592, filed Aug. 26, 1996.

BACKGROUND OF THE INVENTION

1. Field of the Invention

This invention relates to telephone conferencing, and in particular to dial up telephone conferencing utilizing computer control.

2. Description Relative to Prior Art

In the art, it is known that telephone conferences may be implemented through "conferencing centers" provided as a service by local and long distance telephone companies. A list of telephone numbers of the conferees and the date and time at which the conference is to begin is supplied to a conference center operator who performs the dialing operations to bring the conferees simultaneously on line to initiate the conference. This technique is limited by the necessity of setting up a relatively inflexible forum in which all participants must be designated in advance, and the inclusion and reliance upon outside telephone company personnel to implement the conference.

A more recent form of conferencing utilizes digital networks such as the Internet that are publicly accessible by individual computers (typically PCs) via Internet Relay Chat (IRC) hosts. The conferees come on line and are interconnected by means of the host, and may utilize software which allows fully duplexed communication between the PCs. Typically, the conference is conducted with the exchanged information visually appearing on the individual PC display screens. In more sophisticated applications allowing audio communication between the conferees, additional hardware is required at each PC site. A microphone and analog to digital converter provide digitized audio input to a PC by means of appropriate software, such as commercially available VocalTec software, and the audio output is derived from the digital information transmitted over the Internet by use of a digital to analog converter feeding a speaker. Encryption software may be employed to "scramble" the digital information transmitted via the network, but all potential conferees must be provided with this software, and must be alerted to the fact that it is being used. Hence, a conference of multiple conferees requires additional hardware and software at each PC site in order to implement a conference by means of the Internet.

BRIEF DESCRIPTION OF THE DRAWINGS

The invention will be described with respect to the drawings, which.

DESCRIPTION OF THE PREFERRED EMBODIMENTS

Figure 1:
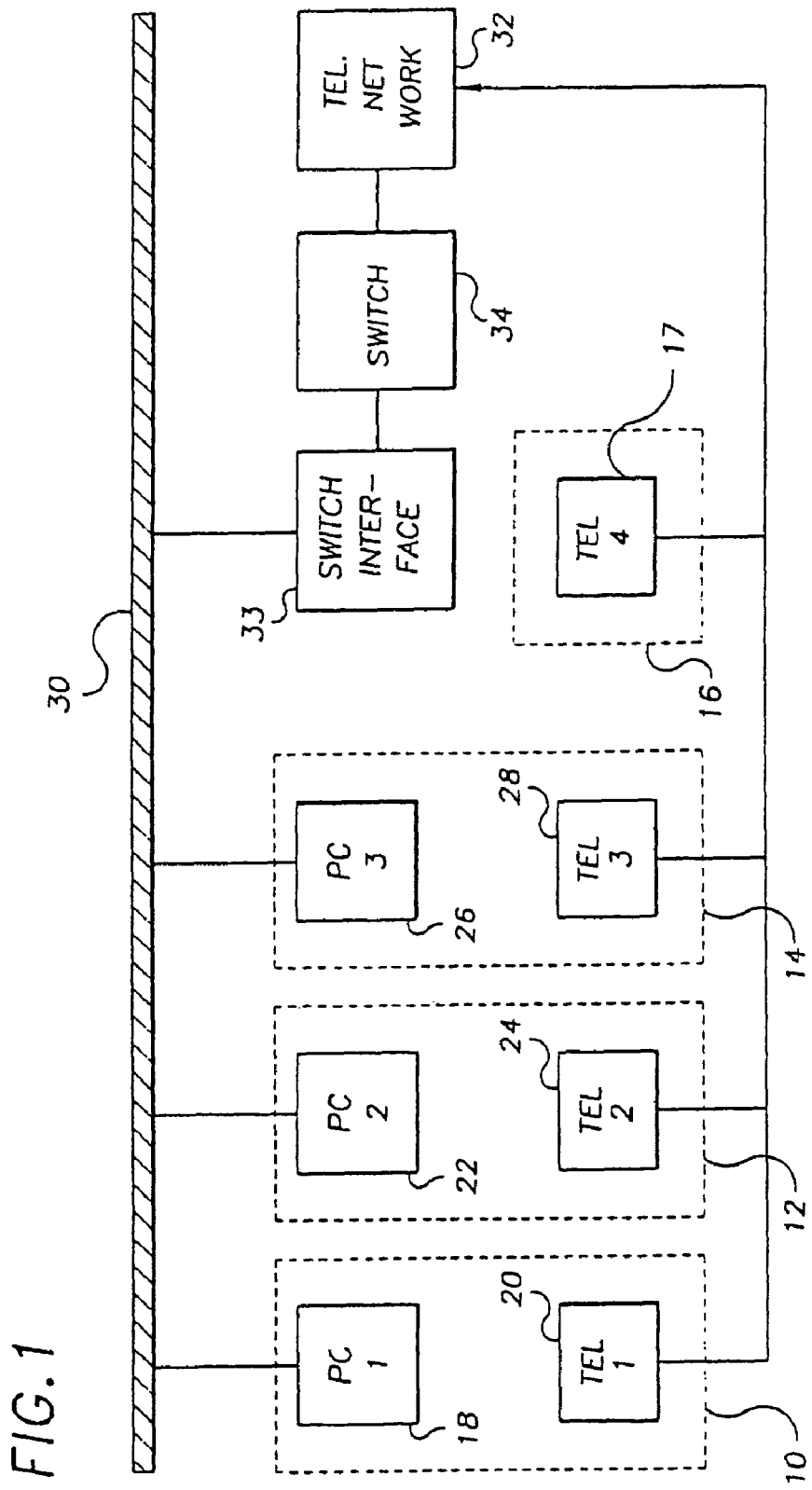
FIG. 1 is a block diagram of the system of the invention.

Referring to FIG. 1, a conferee station 10 consists of a PC computer 18 and a telephone 20. Conferee stations 12, 14, correspondingly have PC computers 22, 26 and telephones 24, 28. Other conferee stations, i.e. 16 may still be connected into the conference network without the requirement of a computer; the conferee station 16 comprising only the telephone 17. All the PCs are connected to the Internet network 30 using standard Transmission Control Protocol/Internet Protocol (TCP/IP) connect software. The telephones 20, 24, 28, 17 are tied into the telephone network 32 in a conventional manner. It will be noted that the telephones 20, 24, 28, 17 are independent of the Internet network 30. A switch interface 33 controlling a telephone switch 34 is also connected so as to receive control signals via the Internet 30 and to transmit them to the telephone network 32, as will be described below.

Any one of the conferee stations 10, 12, 14, possessing a PC, may be designated as Conference Meister. For convenience of explanation, it is assumed that conferee station 14 is designated as Conference Meister. To implement this designation, PC 26 of conferee station 14 is provided with additional software which allows PC 26 to communicate with the switch interface 33 both to control the telephone switch 34 and to receive status information from the telephone switch 34, via the Internet 30.

The Conference Meister station 14 and the switch interface 33 communicate over the TCP/IP transport layer of the Internet 30 using the Internet's User Datagram Protocol (UDP) with checksum. A common fixed-length interprocess message called the Conference Protocol Data Unit (CDPU), using the software format further described below in Table I, is exchanged between the Conference Meister 14 and the switch interface 33, in the data field of a UDP-Datagram. The switch interface 33 converts the CDPU into Signalling System 7 (SS7) commands which act on the switch 34, and attendantly, on the telephone network 32 to control the conferees telephones 20, 24, 28, 17. SS7 is an internationally recognized telephony standard of 255 commands for controlling telephone calls via switch 34 using standard lookup table procedures. The switch interface 33 interacting with the switch 34 may be implemented incorporating a standard micro-computer such as a Motorola 68705P5 performing the table lookup translation of SS7 commands into CPDU commands stored in its ROM memory. It will be noted that the switch interface 33 is bidirectional, and telephone connection status information as established by the switch 34, i.e. ringing, off-hook, on-hook busy, for all participants is transmitted back via the Internet to the Conference Meister for icon display on his PC.

All fields in the CPDU are ASCII character fields. The CPDU consists of 32 bytes of data as follows:

| Session ID/ | Conference ID/ | Command/Response Code/ | Data/ |
|---|---|---|---|
| 4 bytes | 2 bytes | 2 bytes | 24 bytes |

The Session ID and Conference ID fields contain administrative "housekeeping" information. The Command/Response Code field indicates the message type and the message meaning. Parameters of the Data Field are fixed length subfields and depend upon the message type. Detailed descriptions of the Command/Response Code field are shown below in Table I.

TABLE I

| Code | Command | Response | Meaning |
|---|---|---|---|
| HE | ✓ | | HELLO, Conference Meister's Request for Session-Id. |
| LO | | ✓ | LOGON. The Switch Interface's response to a Conference Meister's HE (Hello) assigning him his temporary Session-Id, and signaling him to logon. |
| LO | ✓ | | LOGON. A Conference Meister's logon. information giving used id, password, and account number in the data field. |
| RS | | ✓ | RESOURCES. The Switch Interface's acceptance of a Conference Meister's LO (Logon) |
| EC | ✓ | | ESTABLISH CONNECTION. A Conference Meister's request that a specified telephone number be connected to a conference. |
| SU | | ✓ | SUCCESS. The Switch Interface's response to an EC (Establish Connection) request. If successfully completed. It returns a connection-id used to refer to this members conference connection. |
| FA | | ✓ | FAIL. The reply sent when LO (Logon) or EC (Establish Connection) fails. Failure details are carried in the data field. |
| DC | ✓ | | DISCONNECT. A request from the Conference Meister to disconnect a conference members connection, or to terminate a conference. (disconnect all member connections on the conference). |
| DC | | ✓ | DISCONNECT. An unsolicited response from the Switch Interface notifying the Conference Meister that a conference members connection has been disconnected. |
| ST | ✓ | | STATUS. This command is the Conference Meister's means of maintaining and reconstructing its conference information in the face of dropped connections and unreliable datagram transmissions. |
| ST | | ✓ | STATUS. The Switch Interface's reply to a Conference Meister's status request. |
| ER | | ✓ | ERROR. This is the reply used to signal invalid message parameters, such as Session-Id. |
| IH | ✓ | ✓ | I'M HERE. This message confirms that Conference Meister and Switch Interface are still in contact during intervals when there is no command/response traffic between them. |

In the above description of the invention, the Conference Meister 14 initiates the conference. By providing CDPU software to the other conferees, the invention allows any other one of the conferee stations, i.e. 10, 12, to serve as a Conference Meister.

Figure 4:
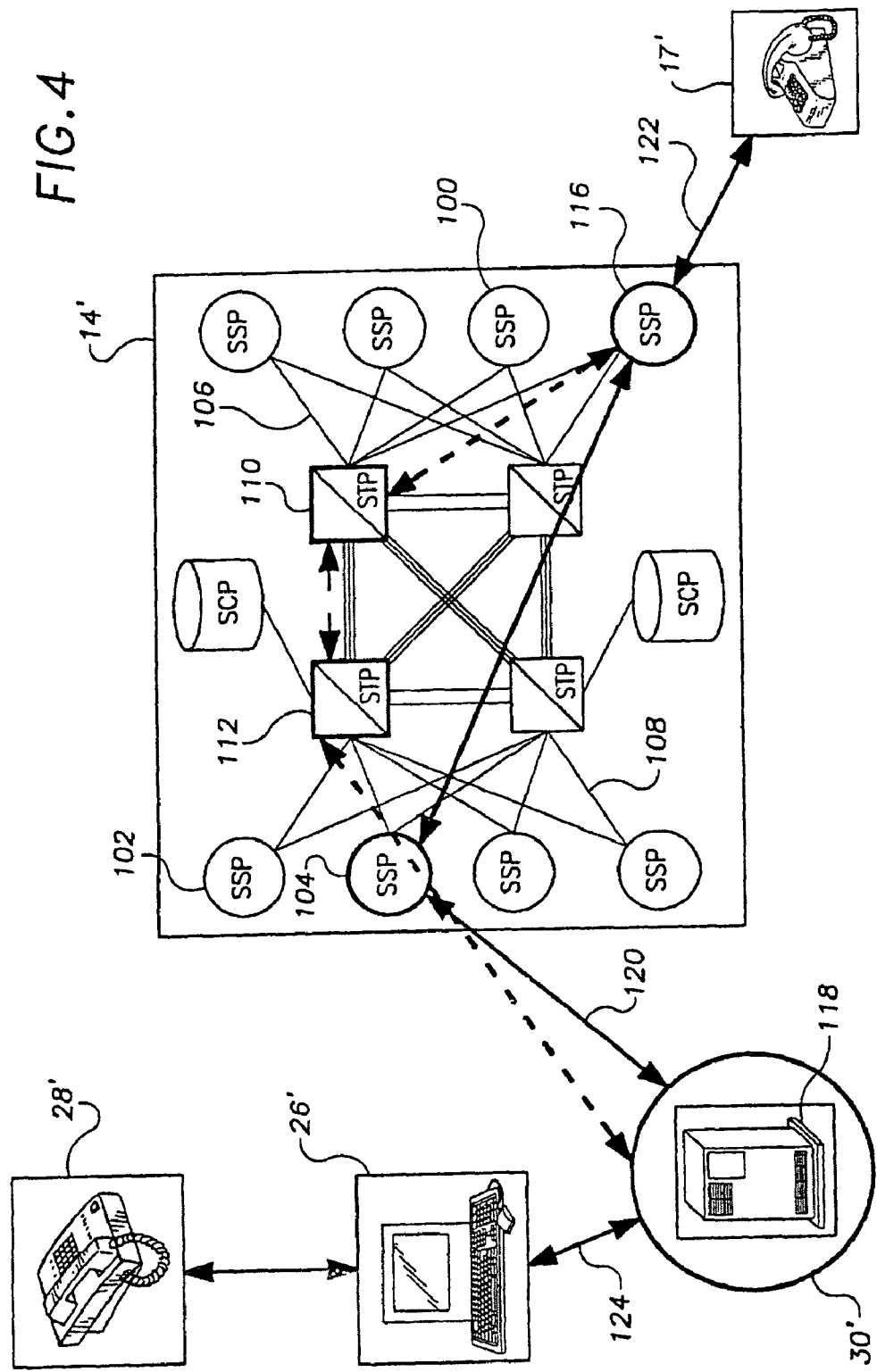
FIG. 4 is a block diagram of the invention showing the information of FIG. 1 in greater detail.

The functional interrelation of the elements of the system illustrated in FIG. 1 may be further understood by reference to FIG. 4. In FIG. 4, the abbreviations, used industry-wide, have the following meanings: SSP=Central Office (i.e. Service Signalling Point), SCP=Service Control Point, (it is an alternate SS7 entry point), and STP=Signal Transfer Point. (In the drawings, different but related elements are identified with the same reference characters, albeit that corresponding elements in the various drawings are distinguished by primes.)

The components of the telephone system are expanded in the box 14' showing one or more interconnected telephone central offices, e.g. 100, 104 that also contain control elements of the SS7 system, e.g. 110, 112. As one example of the interaction between the telephone system and the control disclosed in the present invention, a call placed by telephone 17' using conventional dialing enters the system through telephone central office 116. The call is internally routed, if necessary, by the SS7 control system over the telephone network to a telephone central office 104 which is connected to a telephone system/Internet interface, 33' and 34', that sends SS7 signals to an Internet computer 118 that a telephone call is in process and destined to the Internet 30'. (The dashed lines of FIG. 4 denote digital control functions; while the heavy black lines denote transmitted audio telephone signals as will be described below.) As is known in the art, within the Internet system are digital computers, e.g. 118, acting as routers, servers and capable of performing other digital manipulations. Hence, via the interface/switch control path 33', 34' the telephone central office advises the Internet computer 118, via the SS7/Internet control interface, that an audio signal is to be passed to the Internet. The telephone central office 104 transmits 120 the voice signals 122 originating at telephone 17', to the Internet computer 118 where it is digitized, if necessary, and packetized for transmission on the Internet. This switching and inter-node connecting of this entire process has taken place between the telephone system 14' and the Internet 30' under control of SS7 signals. Internet computer 118 converts or maps the SS7 command signals to TCP control signals that route and process the packets through the Internet, as disclosed above. The message 124 transits the Internet 30' to its destination, say, PC 28 of FIG. 1 where software decodes the audio message 124, rings the telephone 28, and provides an analog audio signal for telephone 28, corresponding to audio signal 122, generated at telephone instrument 17'.

In a second embodiment of the invention, the system of FIG. 1 may be further configured to provide an inherent call-back capability. Though it uses the same conferencing software described above, call-back can be between just two parties. Essentially each PC station is set up so it can serve as a "conference meister"; no other special software or hardware need be installed on a station's PC. Only the initiating station requires a PC or other access to the Internet. A suitably programmed touchtone phone can be used to access the Internet without the use of a computer such as the PC. The two party call-back feature sets up the call via the Internet with the conversation taking place on the normal telephone system in a manner substantially the same as that described above for conferencing.

Figure 2:
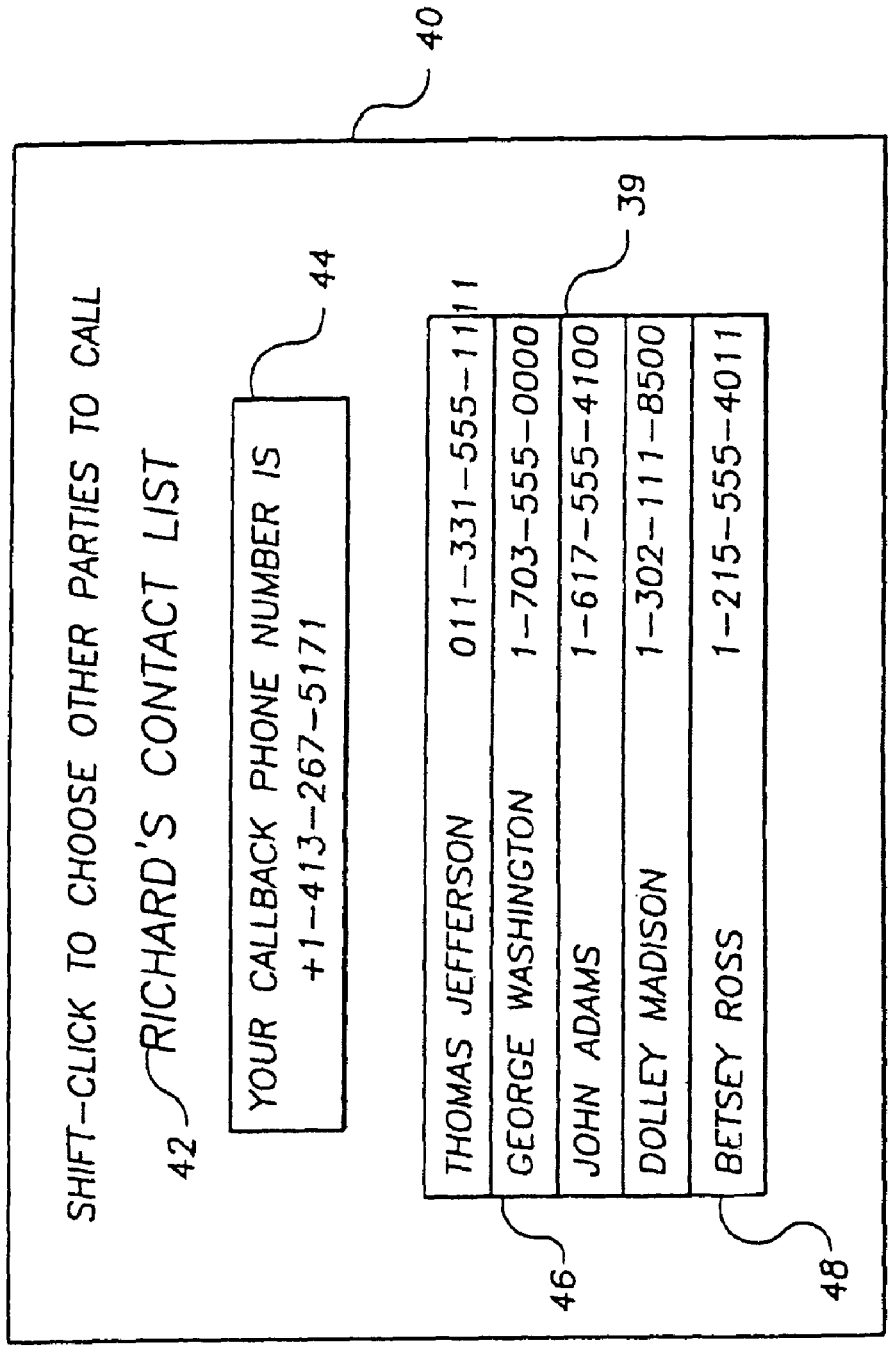
FIG. 2 is a drawing of a computer display according to the invention.

Referring to FIG. 2, a participating PC call-back station shows a display chart 40 on its monitor. The display chart 40 contains the station identification 42 (e.g. Richard) and a contact list 39, and the PC station's call-back telephone number 44. The contacts are shown with their complete dial-up telephone numbers, e.g. 46, 48, and by clicking on one or more of the displayed contacts, calls are dialed to the selected parties via the Internet and the switch 34 of FIG. 1, as previously described for conference calling. It will be appreciated that single parties can be selected to allow two person telephone conversation utilizing the convenience of simplified "point and click" dialing via the stored telephone numbers shown on the PC monitor screen. In the two party call-back connection system described above, it is not necessary to have two telephone lines at a PC station, i.e. one for connection to the Internet and one for carrying the telephonic conversation. With a single telephone line, the system software may be set to instantly disconnect the Internet connection after the called party's number is transmitted by the PC to the switch 34, and to ring the call initiator's telephone simultaneously. In this manner, the calling party and the called party are connected by means of a single telephone line in seconds.

Anonymity of the caller is preserved by the invention even when the calling party has automatic numbering identification (ANI) or "Caller ID". Since the system makes all its connections to the called party via the call-back technique from the remote switch 34 under control of the "conference meister" software, the only records of all the connected telephone numbers are recorded at the switch 34, including the number of the calling party. This occurs because the caller or "conference meister" is also one of the call-back numbers. Each connection is shown as a separate call on the inter-office telephone control (SS7) software originating from the switch 34, not from a calling party's telephone. The switch 34 can have an anonymous telephone number assigned as the originating number. Alternately, the calling party can designate some other listed number for ANI sending or Caller ID purposes which would key the called party as to who is calling.

With the anonymous option, no traceable record of a call is available locally. This minimizes industrial espionage at hotels, customer offices, and even private homes where merely the fact that certain parties made a call could be valuable information. The proper legal authorities can always get the full records from the central switch 34 if need be to document who initiated the call, and which telephones were called.

Figure 3:
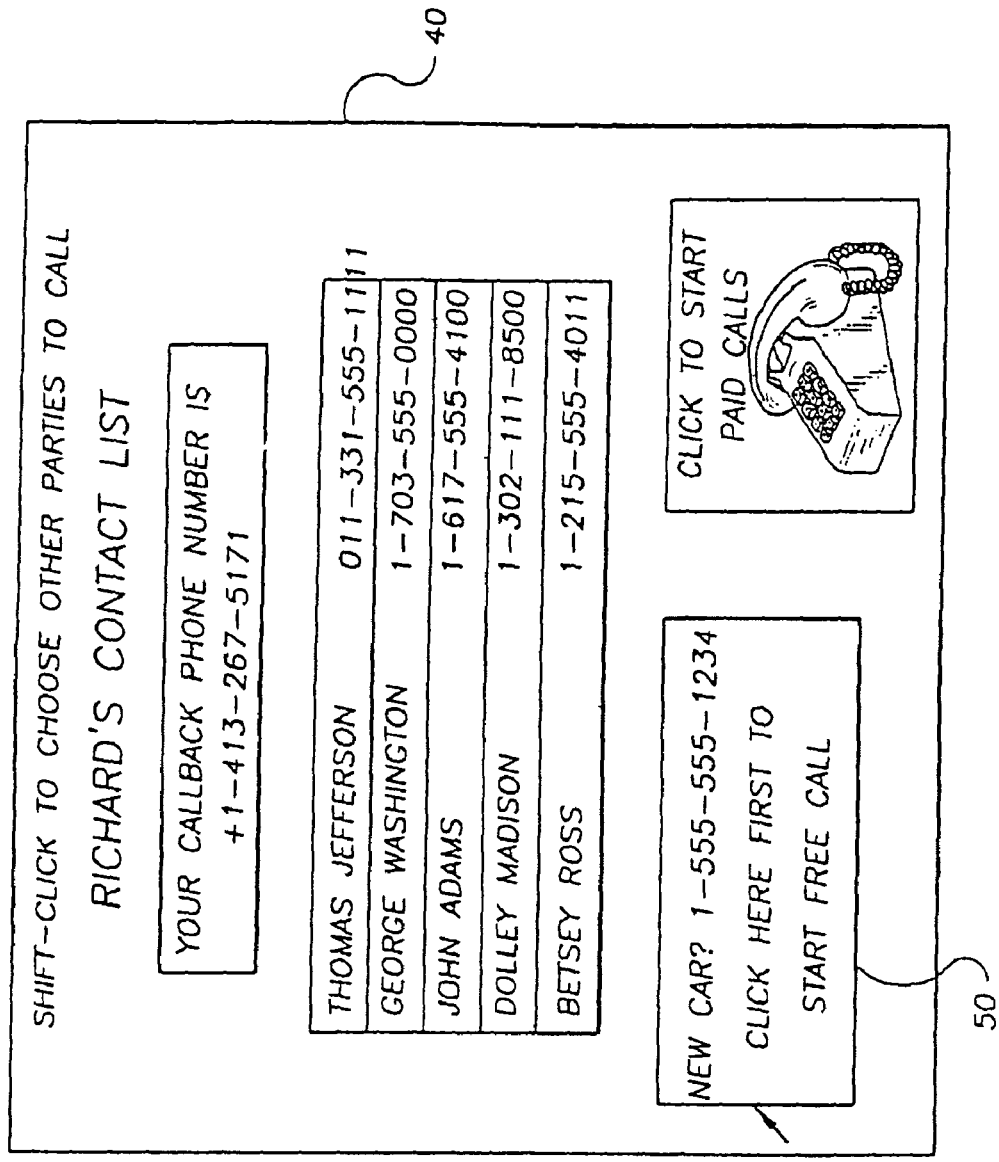
FIG. 3 is a drawing of a second embodiment of a computer display according to the invention.

In a third embodiment, the call-back system can be expanded to include an advertising feature. Referring to FIG. 3, a display 40' is expanded to include an advertising block 50. Under this embodiment, in order to place a call via the call-back system or activate a conference, the program requires clicking on the advertising block 50 by the caller to create a record that the advertisement was seen by the caller. Various subroutines can then be activated such as requiring additional periodic clicks on the advertisement to keep the call connected, or linking the caller to a web page of the advertiser providing additional information as to the users of the system.

It will be noted that the displays 40, 40' are to be implemented in various colors, and that the selection by clicking on any portion of the display will be highlighted in a manner known in the computer art.

The invention has been described in detail with particular reference to preferred embodiments thereof, but it will be understood that variations and modifications can be effected within the spirit and scope of the invention. For example, other data networks, such as a private intranet rather than the Internet, may be used for digital data communication among the conferee PCs, as well as other telephone signaling.

What is claimed is:

1. A method for controlling a telephone, on an SS7 controlled network, such telephone to be used in exchanging audio information, the method comprising:
   receiving, over an IP network, digital control signals relating to a telephone number of the telephone;
   transmitting SS7 commands over an SS7 controlled network in response to the digital control signals to control the telephone;
   obtaining connection status information relating to the telephone from the SS7 controlled network; and
   transmitting the connection status information over the IP network.

2. The method of claim 1 wherein receiving the digital control signals relating to the telephone number is performed by a switch interface via the IP network.

3. The method of claim 1 further comprising converting the digital control signals into the SS7 commands.

4. The method of claim 1 wherein the connection status information comprises an SS7 message that characterizes ringing.

5. The method of claim 1 wherein the connection status information comprises an SS7 message indicating the telephone has been successfully brought on line.

6. The method of claim 1 wherein the connection status information comprises an SS7 message that characterizes an off-hook condition.

7. A method for controlling a telephone, the method comprising:
   receiving, over an IP network, digital control signals relating to a telephone number of the telephone to be brought on line;
   obtaining connection status information relating to the telephone from an SS7 controlled network, wherein the telephone is controlled on the SS7 controlled network;
   sending via the IP network a message indicating the telephone has been successfully brought on line;
   receiving via the SS7 controlled network an SS7 message containing information indicating a disconnect of the telephone; and sending via the IP network a disconnect message responsive to the SS7 message containing information indicating the disconnect.

8. The method of claim 7 wherein the connection status information comprises an SS7 message that characterizes ringing.

9. The method of claim 7 wherein the SS7 message is a first SS7 message, the method further comprising converting the digital control signals into a second SS7 message for ringing up the telephone.

10. The method of claim 9 further comprising transmitting over the SS7 controlled network the second SS7 message for ringing up the telephone in response to the digital control signals.

11. A method of controlling a telephone over an SS7 network, the method comprising:
receiving over an IP network a first digital control signal;
transmitting a first SS7 command over the SS7 network in response to the first digital control signal;
receiving a second SS7 command from the SS7 network, wherein at least one of the first and second SS7 commands includes real time status information of the telephone; and
transmitting over the IP network a second digital control signal in response to the second SS7 command.

12. A method according to claim 11, wherein the first digital control signal includes a telephone number.

13. A method according to claim 11, wherein the real time status information characterizes ringing.

14. A method according to claim 11, wherein the real time status information characterizes an off-hook condition.

15. A method according to claim 11, wherein the first SS7 command is for ringing up the telephone.

16. A method according to claim 11, wherein the second SS7 command includes real time status information characterizing one of an off hook condition or an on hook condition.

17. A method according to claim 11, wherein the second digital control signal indicates a disconnect of the telephone.

18. A method according to claim 11, wherein the real time status information characterizes a busy condition.

19. A method according to claim 11, further comprising:
operating a switch interface coupled to the SS7 network and to the IP network to perform the acts of receiving over an IP network a first digital control signal, transmitting a first SS7 command, receiving a second SS7 command, and transmitting over the IP network a second digital control signal.

20. A method according to claim 11, further comprising:
translating the first digital control signal into the first SS7 command.

21. A method according to claim 20, further comprising:
translating the second SS7 command into the second digital control signal.

22. A method according to claim 21, wherein translating the second SS7 command includes using a lookup table.

23. A method according to claim 20, wherein translating the first digital control signal includes using a lookup table.

* * * * *

UNITED STATES PATENT AND TRADEMARK OFFICE
CERTIFICATE OF CORRECTION

PATENT NO. : 8,077,844 B2  Page 1 of 3
APPLICATION NO. : 12/410269
DATED : December 13, 2011
INVENTOR(S) : Johnson, Jr. et al.

It is certified that error appears in the above-identified patent and that said Letters Patent is hereby corrected as shown below:

Title Page, in Field (56), under "U.S. PATENT DOCUMENTS", in Column 2, Line 1, delete "Herr et al." and insert -- Herr et al...........370/62 --, therefor.

On Title Page 2, in Field (56), under "U.S. PATENT DOCUMENTS", in Column 1, Line 1, delete "McNabb et al." and insert -- McNabb et al...........379/113 --, therefor.

On Title Page 2, in Field (56), under "U.S. PATENT DOCUMENTS", in Column 1, Line 20, delete "Ahuja et al." and insert -- Ahuja et al...........358/400 --, therefor.

On Title Page 2, in Field (56), under "U.S. PATENT DOCUMENTS", in Column 1, Line 36, delete "Bell et al." and insert -- Bell et al...........370/496 --, therefor.

On Title Page 2, in Field (56), under "U.S. PATENT DOCUMENTS", in Column 1, Line 43, delete "Ahuja et al." and insert -- Ahuja et al...........379/202 --, therefor.

On Title Page 2, in Field (56), under "U.S. PATENT DOCUMENTS", in Column 1, Line 75, delete "McIntee et al." and insert -- McIntee et al...........379/220 --, therefor.

On Title Page 2, in Field (56), under "U.S. PATENT DOCUMENTS", in Column 1, Line 77, delete "Miloslavsky" and insert -- Miloslavsky........379/265 --, therefor.

On Title Page 2, in Field (56), under "U.S. PATENT DOCUMENTS", in Column 1, Line 78, delete "Miloslavsky" and insert -- Miloslavsky........379/219 --, therefor.

On Title Page 2, in Field (56), under "U.S. PATENT DOCUMENTS", in Column 2, Line 5, delete "Miloslavsky" and insert -- Miloslavsky........379/265 --, therefor.

On Title Page 2, in Field (56), under "U.S. PATENT DOCUMENTS", in Column 2, Line 29, delete "Lowery et al." and insert -- Lowery et al.........379/202 --, therefor.

Signed and Sealed this
Twenty-third Day of October, 2012

David J. Kappos
*Director of the United States Patent and Trademark Office*

CERTIFICATE OF CORRECTION (continued)
U.S. Pat. No. 8,077,844 B2

On Title Page 2, in Field (56), under "U.S. PATENT DOCUMENTS", in Column 2, Line 35, delete "Miloslavsky" and insert -- Miloslavsky...........379/219 --, therefor.

On Title Page 2, in Field (56), under "U.S. PATENT DOCUMENTS", in Column 2, Line 38, delete "Kikinis" and insert -- Kikinis...........370/352 --, therefor.

On Title Page 2, in Field (56), under "U.S. PATENT DOCUMENTS", in Column 2, Line 39, delete "Miloslavsky" and insert -- Miloslavsky...........379/242 --, therefor.

On Title Page 2, in Field (56), under "U.S. PATENT DOCUMENTS", in Column 2, Line 53, delete "Kikinis" and insert -- Kikinis...........370/352 --, therefor.

On Title Page 2, in Field (56), under "U.S. PATENT DOCUMENTS", in Column 2, Line 56, delete "Ahuja et al." and insert -- Ahuja et al............358/400 --, therefor.

On Title Page 2, in Field (56), under "U.S. PATENT DOCUMENTS", in Column 2, Line 65, delete "Kikinis" and insert -- Kikinis...........370/352 --, therefor.

On Title Page 2, in Field (56), under "U.S. PATENT DOCUMENTS", in Column 2, Line 69, delete "Salama et al." and insert -- Salama et al...........370/351 --, therefor.

On Title Page 2, in Field (56), under "U.S. PATENT DOCUMENTS", in Column 2, Line 73, delete "Bell et al." and insert -- Bell et al...........370/410 --, therefor.

On Title Page 4, in Field (56), under "OTHER PUBLICATIONS", in Column 2, Line 40, delete "eXchage" and insert -- eXchange --, therefor.

On Title Page 4, in Field (56), under "OTHER PUBLICATIONS", in Column 2, Line 51, delete "Communicatoins" and insert -- Communications --, therefor.

On Title Page 6, in Field (56), under "OTHER PUBLICATIONS", in Column 1, Line 53, delete "Servies" and insert -- Services --, therefor.

On Title Page 7, in Field (56), under "OTHER PUBLICATIONS", in Column 2, Line 32, delete "Evalution" and insert -- Evaluation --, therefor.

On Title Page 7, in Field (56), under "OTHER PUBLICATIONS", in Column 2, Line 38, delete "Distrubuted" and insert -- Distributed --, therefor.

On Title Page 7, in Field (56), under "OTHER PUBLICATIONS", in Column 2, Line 47, delete "Multiplexng" and insert -- Multiplexing --, therefor.

On Title Page 8, in Field (56), under "OTHER PUBLICATIONS", in Column 1, Line 24, delete "Respsonse" and insert -- Response --, therefor.

CERTIFICATE OF CORRECTION (continued)
U.S. Pat. No. 8,077,844 B2

On Title Page 10, in Field (56), under "OTHER PUBLICATIONS", in Column 2, Line 33, delete "V/IP-" and insert -- VoIP- --, therefor.

In Column 2, Line 48, delete "(CDPU)," and insert -- (CPDU), --, therefor.

In Column 2, Line 52, delete "CDPU" and insert -- CPDU --, therefor.

In Column 3, Line 56, delete "CDPU" and insert -- CPDU --, therefor.

In Column 7, Line 27, in Claim 12, delete "A method" and insert -- The method --, therefor.

In Column 7, Line 29, in Claim 13, delete "A method" and insert -- The method --, therefor.

In Column 8, Line 1, in Claim 14, delete "A method" and insert -- The method --, therefor.

In Column 8, Line 3, in Claim 15, delete "A method" and insert -- The method --, therefor.

In Column 8, Line 5, in Claim 16, delete "A method" and insert -- The method --, therefor.

In Column 8, Line 8, in Claim 17, delete "A method" and insert -- The method --, therefor.

In Column 8, Line 10, in Claim 18, delete "A method" and insert -- The method --, therefor.

In Column 8, Line 12, in Claim 19, delete "A method" and insert -- The method --, therefor.

In Column 8, Line 19, in Claim 20, delete "A method" and insert -- The method --, therefor.

In Column 8, Line 22, in Claim 21, delete "A method" and insert -- The method --, therefor.

In Column 8, Line 25, in Claim 22, delete "A method" and insert -- The method --, therefor.

In Column 8, Line 27, in Claim 23, delete "A method" and insert -- The method --, therefor.